(12) United States Patent
Bear

(10) Patent No.: US 12,327,213 B2
(45) Date of Patent: Jun. 10, 2025

(54) ENVIRONMENTAL SENSOR DEVICE, SYSTEM, AND METHODS

(71) Applicant: Sensified, LLC, Atlanta, GA (US)

(72) Inventor: Christopher Lloyd Bear, Atlanta, GA (US)

(73) Assignee: Sensified, LLC, Atlanta, GA (US)

( * ) Notice: Subject to any disclaimer, the term of this patent is extended or adjusted under 35 U.S.C. 154(b) by 0 days.

(21) Appl. No.: 18/856,223

(22) PCT Filed: Feb. 8, 2024

(86) PCT No.: PCT/US2024/014934
§ 371 (c)(1),
(2) Date: Oct. 11, 2024

(87) PCT Pub. No.: WO2024/173136
PCT Pub. Date: Aug. 22, 2024

(65) Prior Publication Data
US 2025/0117736 A1   Apr. 10, 2025

Related U.S. Application Data

(63) Continuation of application No. 18/380,112, filed on Oct. 13, 2023.

(60) Provisional application No. 63/445,660, filed on Feb. 14, 2023.

(51) Int. Cl.
*G06Q 10/0832*   (2023.01)
*G06Q 10/0833*   (2023.01)
*H04L 9/08*   (2006.01)
*H04L 9/32*   (2006.01)

(52) U.S. Cl.
CPC ..... *G06Q 10/0832* (2013.01); *G06Q 10/0833* (2013.01); *H04L 9/0825* (2013.01); *H04L 9/3297* (2013.01); *G06Q 2220/00* (2013.01); *H04L 2209/80* (2013.01)

(58) Field of Classification Search
CPC .......... G06Q 10/0832; G06Q 10/0833; G06Q 2220/00; H04L 9/0825; H04L 9/3297; H04L 2209/80
See application file for complete search history.

(56) References Cited

U.S. PATENT DOCUMENTS

| | | |
|---|---|---|
| 2006/0013038 A1 | 1/2006 | Kaiyang et al. |
| 2007/0267509 A1 | 11/2007 | Witty et al. |
| 2012/0200734 A1 | 8/2012 | Tang |

(Continued)

OTHER PUBLICATIONS

Salah, K., Alfalasi, A., Alfalasi, M., Alharmoudi, M., Alzaabi, M., Alzyeodi, A., and Ahmad, R.W., "IoT-Enabled Shipping Container with Environmental Monitoring and Location Tracking," 2020 IEEE 17th Annual Consumer Communications & Networking Conference (CCNC), Las Vegas, Nevada, 2020, pp. 1-6.*

(Continued)

*Primary Examiner* — Nathan Erb
(74) *Attorney, Agent, or Firm* — SNELL & WILMER L.L.P.

(57) ABSTRACT

An electronic system for an environmental sensor device is configured to continually collect environmental data (e.g., temperature data, humidity data, or the like). The environmental sensor device is configured to be transported within a container and collect environmental data throughout the shipment.

33 Claims, 14 Drawing Sheets

(56) References Cited

U.S. PATENT DOCUMENTS

| | | |
|---|---|---|
| 2015/0358177 A1 | 12/2015 | Lee |
| 2016/0321580 A1* | 11/2016 | Chroscielewski .. H04L 63/0428 |
| 2016/0371957 A1 | 12/2016 | Ghaffari et al. |
| 2017/0261379 A1 | 9/2017 | Haile et al. |
| 2018/0034642 A1 | 2/2018 | Kaehler |
| 2018/0045666 A1 | 2/2018 | Sims |
| 2018/0220278 A1* | 8/2018 | Tal ........................ H04L 9/3236 |
| 2019/0364398 A1 | 11/2019 | Castonzo |
| 2020/0096997 A1 | 3/2020 | Cella et al. |
| 2020/0395627 A1* | 12/2020 | Kilburn ............... H02J 7/00714 |
| 2021/0082220 A1 | 3/2021 | Boerger et al. |
| 2022/0101992 A1 | 3/2022 | Porter et al. |

OTHER PUBLICATIONS

ISA; PCT International Search Report and the Written Opinion dated Jul. 16, 2024 in Application PCT/US2024/014934.

* cited by examiner

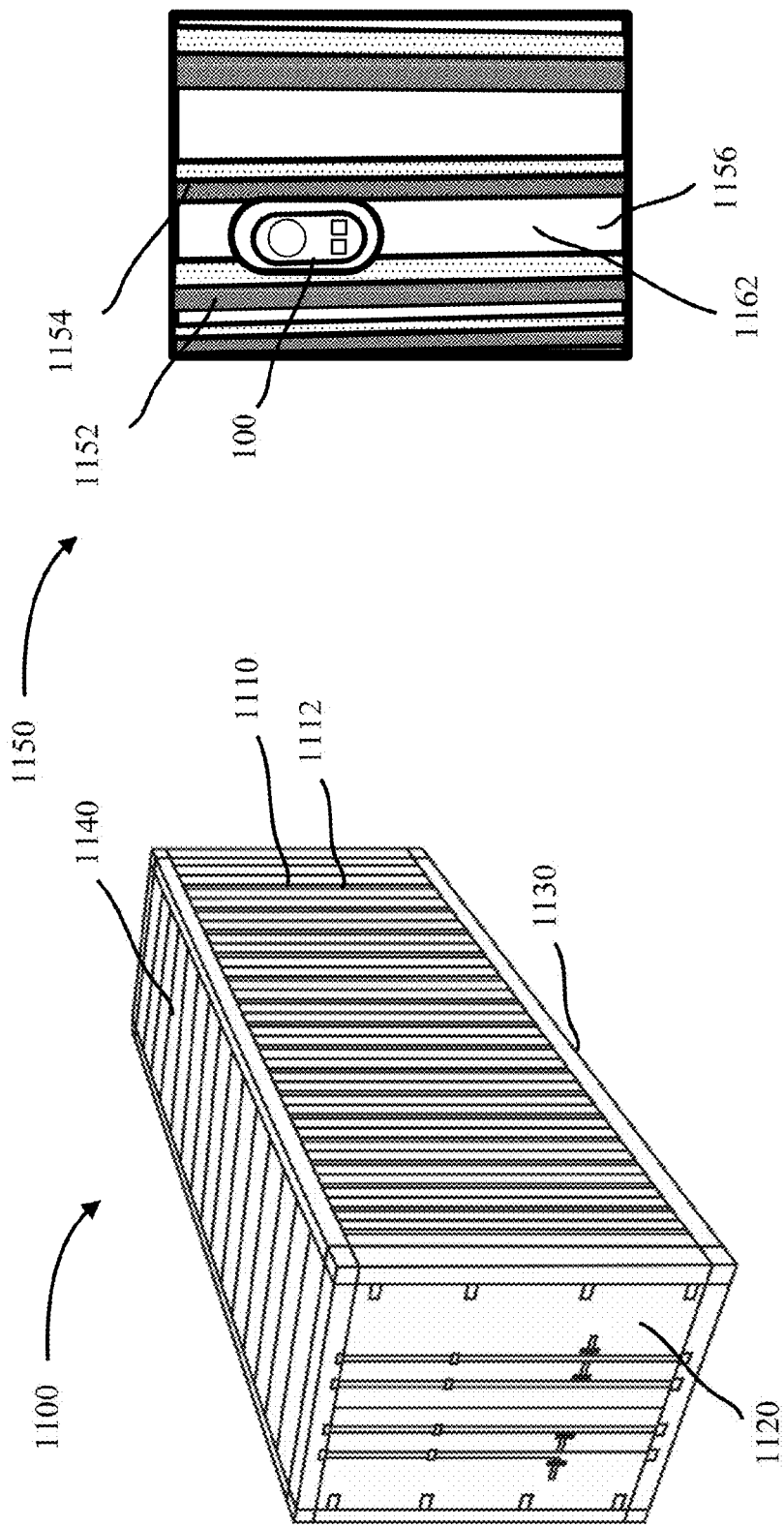

ENVIRONMENTAL SENSOR DEVICE, SYSTEM, AND METHODS

CROSS REFERENCE TO RELATED APPLICATIONS

This application is a U.S. National Stage Entry under 35 U.S.C. § 371 of International Application No. PCT/US/2024/014934 filed on Feb. 8, 2024, entitled "ENVIRONMENTAL SENSOR DEVICE, SYSTEM, AND METHODS" (hereinafter the '934 Application) which claims-priority to and the benefit of U.S. Non-Provisional application Ser. No. 18/380,112, entitled "ENVIRONMENTAL SENSOR DEVICE, SYSTEM, AND METHODS," filed Oct. 13, 2023 (hereinafter the '112 Application). The '112 Application claims priority to and the benefit of U.S. Provisional Application No. 63/445,660, entitled "REMOTE ENVIRONMENTAL SENSOR PLATFORM," filed on Feb. 14, 2023 (hereinafter the '660 Application). Both the '112 Application and the '660 Application are hereby incorporated by reference in their entirety for all purposes.

FIELD

The present disclosure generally relates to remote sensor systems, and more particularly to logistic environment sensors for sensitive shipments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Shipping carriers transport a wide variety of products on behalf of their customers. In most cases, a carrier's customers are either a sender (or "consignor") or a receiver (or "consignee"). As the terms are used herein, a "sender" refers to the person or entity sending the product to a receiver via the carrier, and the "receiver" is the person or entity receiving the product from the sender via the carrier.

Typically, a sender places a product to be shipped in a container or package for shipment, attaches an address label indicating the identity of the receiver and the receiver's address, and leaves the container with the product in a designated place for pickup by the carrier for delivery to the receiver. A driver of a carrier vehicle typically obtains the container with enclosed product at the pickup location, and uses a handheld wireless device to enter relevant data from the shipping label into a tracking system so that the fact that the container and product has been picked up by the carrier can be recorded. The driver then loads the container with its product in the vehicle, and transports same to a hub for sorting and distribution to the next location along the route designated for the package by the carrier's internal routing and control systems. From this hub, the container can be directly delivered to the receiver's location if the delivery is to a receiver in the same vicinity as the sender.

Alternatively, the container with the product can be transported via ship, aircraft, train, or a wheeled vehicle to another hub nearer to the receiver's location. It is possible that the container with product can be transported through one or more intermediate hubs before reaching the hub serving the receiver location. A delivery vehicle then transports the container and product therein along the final leg of its route to the receiver's location to complete delivery of the product in its container. The receiver can then open the container and retrieve the product for its own use or can deliver or sell the product to another person in the distribution chain to the end user of the product.

For the purpose of routing, tracking, and billing for shipment of a product, a carrier can maintain computerized shipping records identifying the sender, the sender's shipping account to be charged for the product shipment, the sender's address, the receiver, the receiver's address for delivery, the level of service selected for shipping the product (i.e., overnight delivery, next-day delivery, two-day delivery, etc.), the weight and dimensions of the container and enclosed product which can be used for logistics planning and billing for the product shipment, special handling instructions for the product, and possibly other information. Some carriers provide the capability to track a shipped product in transit from the sender to the receiver. This provides the benefit of permitting the sender and receiver to determine the status of the shipped product while it is within the carrier's transportation and storage network.

In addition to providing peace of mind to the sender and/or receiver as to the location and status of the product within the carrier's transportation and storage network at any given time, such tracking information can permit the receiver to project when the product will arrive at the receiver's location. The receiver can thus plan activities that are contingent upon receipt of the product, such as the availability of machinery and labor for handling the product, etc. In addition, tracking information permits the sender or receiver to verify that certain actions, such as shipping or delivery of the product, have in fact been taken. This can be useful for verifying compliance (or determining noncompliance) with a contract between the sender and receiver. Such tracking information can also be useful to interested third parties such as insurers, guarantors, or banks, who can have an interest in a product shipment.

To access tracking information, some carriers permit use of a tracking identifier, generally included as a string of alphanumeric characters or bar code, on the shipping label. A customer or other interested party can access such tracking information by contacting a customer service representative of the carrier by telephone and providing the tracking identifier to such representative. The representative can then use the tracking identifier to reference the computerized shipping records via a network internal to the carrier to provide the requested product status information to the customer. Alternatively, some carriers permit customers to directly access shipment tracking information by using a web-based device to access the carrier's computer system via the Internet.

Despite the wide variety of goods shipped by a carrier, most items are transported in a routine manner according to standard shipping procedures developed by the carrier. In other words, despite the various sizes and types of containers and products that can be shipped by a carrier, the containers and their products are handled in the same general way using the same integrated system of hubs with sorters, conveyors, loading and unloading locations, storage areas, and transportation vehicles. However, in some cases, the nature of some products can require a carrier to apply special handling or exception processing during the transporting of such products from a sender to a receiver. The term "special handling" encompasses a variety of operations in which particular products (or a shipment of products) are identified and separated from routine product shipments to be handled differently from routine product shipments in the shipping carrier's transportation and storage system. Such special handling can include, for example, transporting sensitive, explosive, hazardous, or toxic products in a special way. Such handling can be mandated by applicable law or regulation for shipment of the product, can be necessary in order to comply with a customer's request for handling the product, or can be necessary due to the carrier's internal policies or experiences with products of a particular nature. For example, the carrier can be asked by a customer or third party to verify that a refrigerated container holding biological material is functioning at various points along the container's shipping route.

Maintaining the integrity of a product in its protective container throughout transport can be critical to use of the contained product by the receiver or end user. For example, medicine typically needs to be maintained within a certain temperature range in order to preserve efficacy. Therefore, a carrier can be requested to handle a package containing medicine with extra care or to inspect the package at one or more points along its route to assure continued viability of the product. For example, the carrier can transport a medicine shipment in a temperature-controlled container. By checking a temperature gauge associated with the container at various points along the transportation route designated for the medical product in the carrier's logistics network, proper handling of the product can be inferred from gauge readings confirming the product to be at a permissible temperature.

However, such technique does not inform or alert the carrier and customer as to whether proper environmental conditions were or were not maintained during the times the product was in the carrier's logistics network between checkpoints. Therefore, unbeknownst to either the carrier or customer, it is possible that the receiver can be provided with a product shipment that was subjected to an environmental condition that makes it unfit for use by the receiver or end user. Thus, exposure to an environmental condition can damage or destroy the product shipment, or possibly even render it dangerous to the receiver or end user. Furthermore, continuing to ship a product that has been rendered unfit for the receiver's or end user's purposes by exposure to an environmental condition can result in a substantial waste of transportation, labor, financial, and other resources of the carrier and/or the customer.

Given the global reach of commerce, containers may travel through a plurality of environments, and it is therefore desirable that the end user or receiver be able to verify shipment integrity by including a remote environmental sensor traveling with the shipment through the carrier's logistics network.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 11A illustrates a perspective view of a shipping container, in accordance with various embodiments.

FIG. 11B illustrates an environmental sensor device mounted within the shipping container, in accordance with various embodiments.

DETAILED DESCRIPTION

Figure 1:
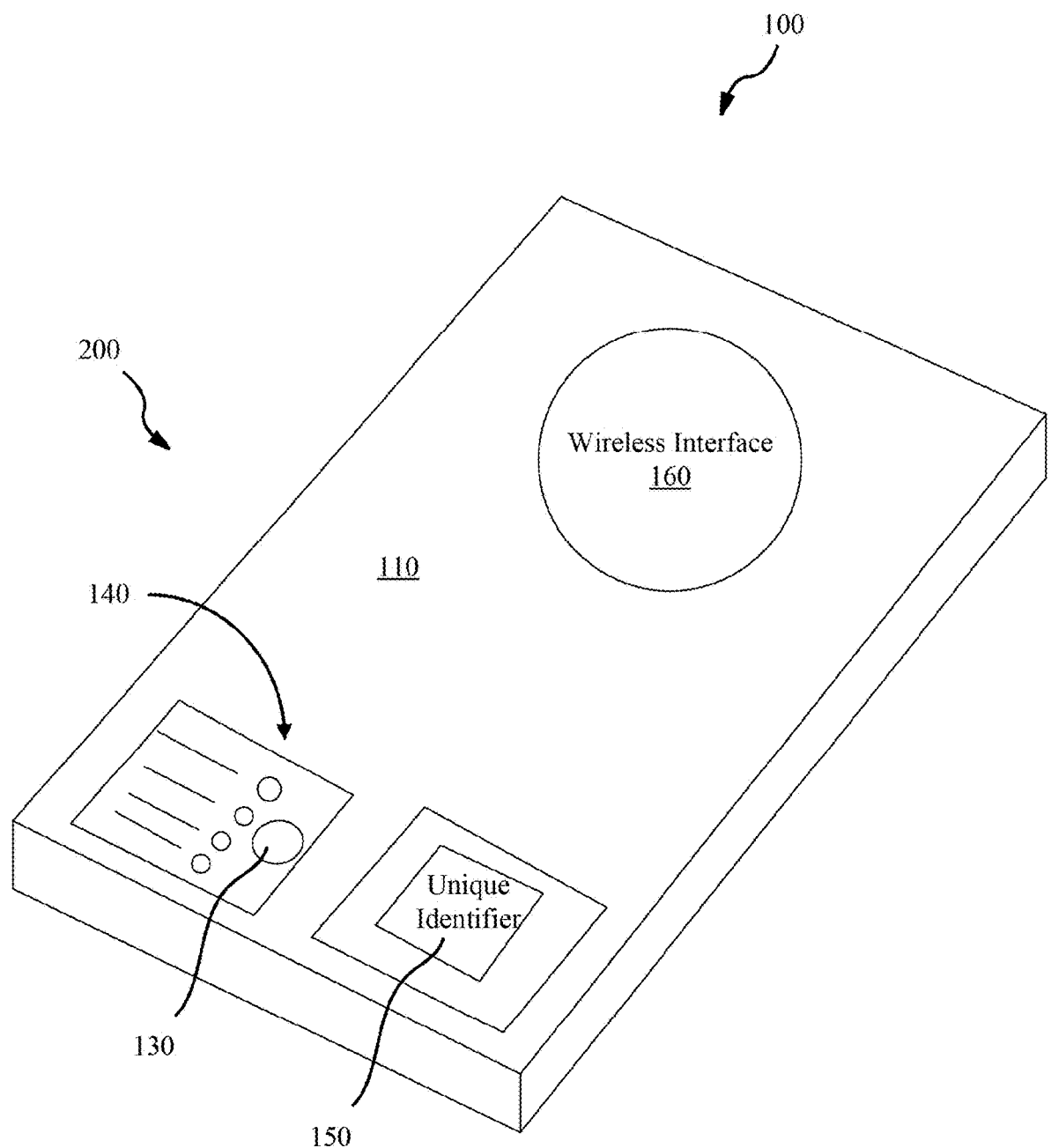
FIG. 1 illustrates a perspective view of an environmental sensor device, in accordance with various embodiments.

The detailed description of various embodiments herein refers to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. For example, the description or claims may refer to a processor for convenience, but the invention and claim scope contemplates that the processor may be multiple processors. The multiple processors may handle separate tasks or combine to handle certain tasks. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The system may allow users to access data and receive updated data in real time from other users. The system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. The system allows remote users to share data in real time in a standardized format, regardless of the format (e.g., non-standardized) that the information was input by the user. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. The system may include a filter on a local computer and a filter on a server.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Existing systems and methods for logistics environment sensing include technical limitations in sensor logging, integration, and control. Current systems tend to be USB-based with a start and stop button(s) to control recording. Recording data may only accessible or retrievable locally and after the fact through direct access to the device. Furthermore, existing systems tend to require senders, receivers, and carriers adopt specialized hardware to implement the system. Senders and receivers tend to require particular devices to communicate with and configure the system for environmental logging. Carriers may require access points and/or hubs stationed along the route to enable retrieval of logs and status updating. A simplified system which reduces the burden on shippers, receivers, and carriers is therefore desirable. The systems and methods disclosed herein provide a technical solution by enabling a fully autonomous remote environmental sensing platform. For example, by continuous logging environmental data in a circular buffer, shippers are no longer required to perform any device configuration. Furthermore, by integrating with existing carrier data sources the system may construct an environmental profile for the shipment without requiring the carrier to install new hardware. Additionally, by integrating with existing mobile devices, sensor data may be autonomously retrieved and fused for presentation to the receiver. In this regard, the systems and methods disclosed herein accelerate the recording, retrieving, and fusing environmental sensor data.

Disclosed herein is an environmental sensor device for use in tracking environmental data within a container for post-processing by a receiver, end user, logistics personnel, or the like. A "container" as referred to herein is any container capable of being shipped. In this regard, the container can comprise a cryogenic vessel, a refrigerated container, a tank container, an insulated container, a box, an envelope, or any type of temperature, or environmentally controlled container, in accordance with various embodiments. Stated another way, a "container" as disclosed herein can include a container configured hold one or more products during a shipment (e.g., a box, a package, an envelope, or the like), a container configured to hold a plurality of packages (e.g., a shipping container, such as a twenty-foot shipping container, a forty-foot shipping container, a twenty-foot high cube shipping container, or the like). The present disclosure is not limited in this regard.

Although described herein as being utilized in post-processing by a receive (or end user), the present disclosure is not limited in this regard. For example, the environmental sensor device and systems disclosed herein could be utilized for tracking and/or monitoring of environmental data for a shipment during transport and still be within the scope of this disclosure. In this regard, in accordance with various embodiments, the environmental data can be collected wirelessly at various checkpoints along a shipping route (e.g., via a logistics employee or the like), and the environmental data can be logged in a database and associated with the respective environmental sensor device and a respective tracking identifier for the shipment.

The environmental sensor device disclosed herein is configured to continually collect sensor measurements (e.g., temperature measurements, light measurements, pressure measurements, or any other desirable monitoring parameter for a respective shipment), aggregate the measurements into periodic samples (e.g., by calculating the mean measurement, the median measurement, or the like), and storing the periodic samples in a circular buffer, in accordance with various embodiments. In various embodiments, the environmental sensor device continually collects measurements via one or more circular buffers. A "circular buffer" as referred to herein includes a data structure that utilizes a single, fixed size buffer as if it were connected end-to-end. Stated another way, a "circular buffer," as referred to herein is a data structure configured for continually collecting data. A circular buffer as referred to herein can include any of the following types of data structures: a ring buffer, a circular queue, a bipartite buffer, a bip-buffer or the like. The present disclosure is not limited in this regard.

A "buffer" as referred to herein, includes a region of a memory used to temporarily store data while it is being moved from one place to another. A "buffer size" as referred to herein is a buffer capacity (e.g., a length of a buffer). In various embodiments, by continually collecting measurement data in the manner disclosed herein, a specific action may not be required by a user to start recording of environmental data.

The environmental sensor device disclosed herein is configured to transmit recorded environmental data (e.g., stored data from the circular buffer) wirelessly (e.g., via radio wave communications, such as near-field communication, Bluetooth® communication or the like). Although described herein as transmitting the data wirelessly, the present disclosure is not limited in this regard. For example, the environmental sensor device could include a port (e.g., a USB port or the like) configured to couple the environmental sensor device in a wired manner to a user device (e.g., a phone, a tablet, a computer, or the like) to transmit the recorded data. In various embodiments, the recorded environmental data is transmitted in an information block. An "information block" as referred to herein is data structure including a physical record. In various embodiments, the "information block" as disclosed herein can include pre-stored data (e.g., a device identifier, one or more authentication keys, a Uniform Resource Identifier ("URI"), or the like), and environmental data that is stored during operation of the environmental sensor device (e.g., temperature data, light data, or the like stored in the circular buffer). In various embodiments, as described further herein, in response to a user device (e.g., a phone, a table, a computer or the like) receiving the information block (e.g., through wireless or wired communication), the URI facilitates decoding encoded data from the information block, updating a data record with the environmental data, and generating a display (e.g., through a graphical user interface on the user device) whether the user has a mobile application or not.

A system for securely generating environmental data in a standard, readable format is disclosed herein. The system includes one or more servers (e.g., one or more backend servers). In various embodiments, the one or more servers are configured to receive encoded data, in response to a computer-based system transmitting the encoded data to the one or more backend servers. The environmental sensor device can be configured to transmit the URI, which can cause the computer-based system that receives the URI to automatically transmit the encoded data with the environmental sensor data to the one or more backend servers. In response to the one or more backend servers receiving the encoded data, the one or more servers decodes the encoded data, updates a data record with the environmental data, generates a formatted document from the environmental data, and transmits the formatted document for display on the computer-based system. In various embodiments, by decoding the data through the one or more servers (e.g., one or more backend servers), the environmental data can be more securely retrieved and provided to an end user, in accordance with various embodiments.

In various embodiments, the system disclosed herein can include various potential options for demarking a start time for shipping of a container with the environmental sensor device disposed therein. For example, in various embodiments, a start time can be set via a graphical user interface that can communicate (e.g., wirelessly or wired) with the environmental sensor device; In various embodiments, a data input (e.g., a start button) can be disposed on the environmental sensor device. In this regard, the start time can be demarked in response to the start button being depressed. In various embodiments, the start time can be demarked after the container with the environmental sensor has been received. For example, a user can manually set a start time to capture a snapshot of environmental data after receiving the respective shipment, in accordance with various embodiments.

In various embodiments, the start time can be demarked via internal data. For example, prior to placing the environmental sensor device in a container for tracking the environmental data of the container, the environmental sensor device can be scanned (e.g., by a shipper, by a logistics employee, or the like). In this regard, in response to the scanning, a start time can be recorded in the one or more servers, in accordance with various embodiments. In this regard, a shipper (or sender's) system can be connected to the one or more servers of the system disclosed herein, and in response to scanning a unique identifier of the environmental sensor device, the system can inform the one or more servers that the recording should be started (e.g., via an API call), in accordance with various embodiments. In various embodiments, external data can be utilized to demark a start time. For example, upon arriving at the shipping process can include various checkpoints where the container is tracked, and a status of the container is recorded. In this regard, after the container is packed with the environmental sensor device and ready for transit, the status of the container may be updated by the shipper. In this regard, the external data can be utilized to automatically demark the start time, in accordance with various embodiments.

While mostly referred to herein as being designed to be included within packages when shipped or stored as a part of a temperature-controlled logistics workflow, individual components within a cold supply chain (e.g., reefer trucks, warehouses, or the like) can also be monitored via environmental sensor devices as disclosed herein. For example, the environmental sensor devices disclosed herein can be fixedly (or removably) coupled (i.e., mounted) within a trailer, a shipping container, a warehouse, a refrigerated unit, or the like and configured to continually accumulate temperature samples, in accordance with various embodiments. In various embodiments, shipping containers that are being shipped via sea freight can be equipped with the environmental sensor device disclosed herein to facilitate tracking by freight forwarder or any other logistics personnel.

In various embodiments, as described further herein, many stationary applications, such as coolers and temperature-controlled warehouses, have other alarming mechanisms, and are still inspected regularly, whether that's monthly, weekly, or even daily. In these cases, the value of a passive system with the environmental sensor device disclosed herein could provide easy-to-read updates so that inspectors can associate the temperature history with the physical environmental sensor device.

Referring now to FIG. 1, a perspective view of an environmental sensor device 100 having an electronic system 300 is illustrated, in accordance with various embodiments. The environmental sensor device 100 comprises a housing 110, an electronic system 300 disposed within the housing 110 (e.g., on a printed circuit board or the like), and a power supply (e.g., power supply 120 from FIG. 2), such as a battery or the like. The environmental sensor device 100 is configured to continually collect (e.g., via the electronic system 300) environmental data samples (e.g., temperature samples, humidity samples or the like) from one or more environmental sensors (e.g., one or more temperature sensors, one or more humidity sensors, or the like). As described further herein, the environmental data samples can be continually collected in a circular buffer to form a circular buffer data set. Although described herein as including a circular buffer, the present disclosure is not limited in this regard. For example, similar data structures, such as a bip-buffer or any other buffer that overwrites the oldest samples with the newest samples can be utilized and still be within the scope of this disclosure.

"Continually collect" as referred to herein means collecting environmental data in a continual manner (e.g., at regular and/or frequent intervals) without stopping. Stated another way, "continually collect" as referred to herein refers to collecting data in a repeated manner, without stopping, as long as power is provided to the electronic system 300. In this regard, a user cannot stop the collecting of data by the environmental sensor device 100. In various embodiments, by continually collecting environmental data without input by a user, the environmental sensor device 100 can be mistake proofed. For example, a user can never forget to turn on the environmental sensor device 100 as the environmental sensor device 100 is continuously running, and continually collecting the environmental data, in accordance with various embodiments.

In various embodiments, when the environmental sensor device 100 is configured for a shipping container (e.g., for sea freight shipping or the like), the housing 110 can include the cuboid-type footprint. In this regard, the housing can be sided and configured to fit within a corrugation of the shipping container (i.e., both in terms of width and depth), and shaped such that casual bumps from cargo being loaded and unloaded will not dislodge the sensor device. In this regard, the housing 110 can include rounded features, in accordance with various embodiments.

For example, with brief reference now to FIGS. 11A and 11B, a perspective view of a shipping container 1100 (FIG. 11A) with an environmental sensor device 100 mounted therein (FIG. 11B) are illustrated in accordance with various embodiments. The shipping container 1100 can comprises a housing 1110 configured to house one or more packages to be shipped as described further herein. The housing 1110 can comprise side panels 1112, a bottom panel 1130, a top panel 1140, and one or more doors 1120. The side panels 1112 at least partially define a perimeter of the housing 1110. The one or more doors 1120 can be disposed at a longitudinal end of the housing 1110. However, the present disclosure is not limited in this regard. For example, the top panel 1140 can be removable and the one or more doors 1120 can be replaced with a side panel and still be within the scope of this disclosure. A bottom panel 1130 can be configured as a floor of the housing 1110, and the top panel 1140 can protect the one or more packages from an external environment. In various embodiments, each of the side panels 1112 comprises corrugated walls. In this regard, a side panel 1150 of the side panels 1112 can comprise a plurality of protrusions (e.g., a protrusion 1152 and a protrusion 1154). Each of the plurality of protrusions extend inward (i.e., into a cavity 1162) of the housing 1110 from an outer wall 1156. In this regard, a protrusion 1152, outer wall 1156, and a protrusion 1154 can form a peak-trough-peak combination of a corrugated side panel (e.g., side panel 1150). In various embodiments, the environmental sensor device 100 can be mounted between protrusion 1152 and protrusion 1154 to the outer wall 1156 (e.g., via an adhesive, via fasteners, via a mount, or the like). In various embodiments, by being disposed between the protrusions 1152, 1154, the environmental sensor device 100 will not affect a volume that the shipping container 1100 is capable of holding. In various embodiments, by mounting the environmental sensor device 100 within a shipping container 1100, environmental data can be continually collected as described herein, and transmitted to an external system periodically, as described further herein.

The environmental sensor device 100 is configured to wirelessly connect (e.g., via Bluetooth® communications, low energy Bluetooth® communications, near-field communications ("NFC"), or the like) to a user device (e.g., a phone, a table, a computer, or the like) through a communications module (e.g., communications module 320 from FIG. 2). Although described herein as being configured to wirelessly connect to a user device, the present disclosure is not limited in this regard. For example, the environmental sensor device 100 can be configured to be electrically coupled via a wired connection (e.g., through a universal serial bus or the like) and still be within the scope of this disclosure. However, by having an easy-to-use wireless interface 160, the environmental sensor device 100 can facilitate fast, easy, and/or efficient transmission of environmental data to a user (e.g., a logistics personnel, an end user, or the like), which can in turn transmit the environmental data to a platform with few extraneous steps by the user, and without the environmental sensor device 100 being removed from a container.

Figure 3:
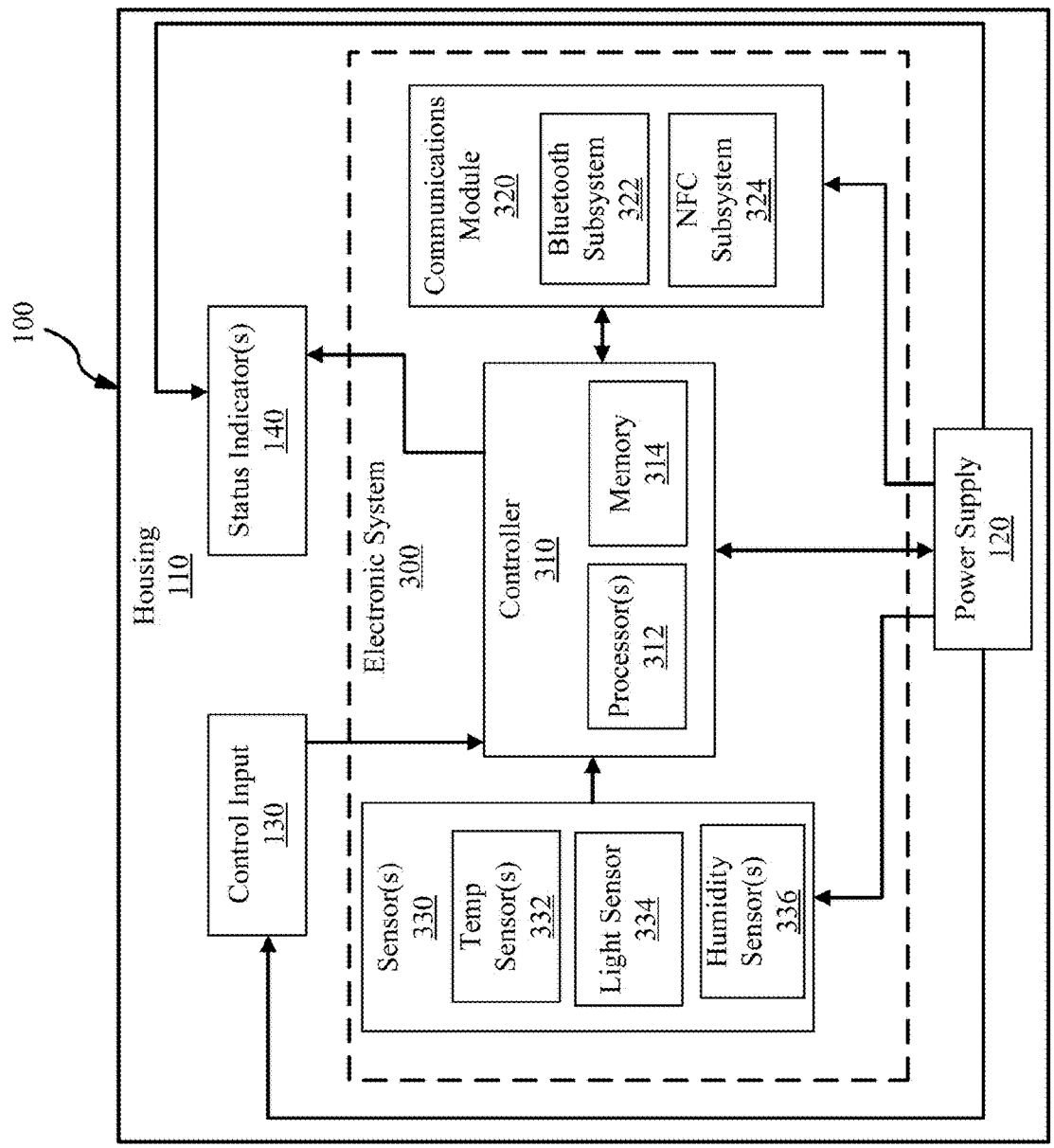
FIG. 3 illustrates a schematic view of an electronic system of the environmental sensor device from FIG. 1, in accordance with various embodiments.

In various embodiments, as described further herein, in response to connecting to a user device (e.g., phone, a tablet, or the like of a logistics personnel, and end user, or the like), the environmental sensor device 100 is configured to automatically transmit an information block including the environmental data set (e.g., a circular buffer data set, a bip-buffer data set, or the like) to the user device through the communication module (e.g., the communications module 320 from FIG. 3).

In various embodiments, the environmental sensor device 100 comprises a control input 130 (e.g., a button, a switch, a rotatable knob, or the like. In various embodiments, the control input 130 is coupled to the housing 110). In this regard, as described further herein, a user can activate the control input 130 to generate a timestamp to associate a beginning (or ending) of a shipping process where it is desirable to track environmental data related to the shipment.

In various embodiments, the environmental sensor device 100 further comprises one or more status indicators 140 and a unique identifier 150. In various embodiments, the one or more status indicators 140 can be configured to indicate a status of the environmental sensor device 100 (e.g., whether the device is functioning properly, whether temperature measurements are within a threshold range, over a maximum temperature threshold, under a minimum temperature threshold, provide indications of status during commissioning, or the like). In various embodiments, the unique identifier 150 can comprises a machine-readable code (e.g., a quick-response (QR) code, an image recognizable code, a SnapTag, or the like). In this regard, in response to scanning the machine-readable code, a user device can be directed to a graphical user interface to download an application (or micro-application) associated with the environmental sensor device 100, as described further herein. However, the present disclosure is not limited in this regard. For example, a user can utilize the environmental sensor device 100 without downloading the application (or micro-application), and still be able to post-process, and view the environmental data, in accordance with various embodiments. In various embodiments, the one or more status indicators 140 include one or more light sources (e.g., a light emitting diode (LED) or the like), which can be different colors to provide different indications to a user (or manufacturer), as described further herein.

In various embodiments, the housing 110 can include a cuboid shape. In this regard, the housing 110 can be configured to be easy to hold and easy to transport, in accordance with various embodiments. In various embodiments, the housing 110 can also provide for an ease of assembly by allowing for the electronic system 300 to be disposed on a printed circuit board having a rectangular shape for ease of manufacture. However, the present disclosure is not limited in this regard, and various other shapes for the housing 110 are within the scope of this disclosure, such as any polygonal prism, a cube, or the like.

In various embodiments, the electronic system 300 and the power supply (e.g., power supply 120 from FIG. 3) are each disposed in the housing 110. As described further herein, the electronic system 300 is configured to perform various operations to passively track environmental data corresponding to an environment surrounding the housing 110 of the environmental sensor device 100 (e.g., within a container), aggregate at least portions of the environmental data, and transfer the aggregated data (e.g., in response to a user device communicating with the electronic system 300).

Figure 2A:
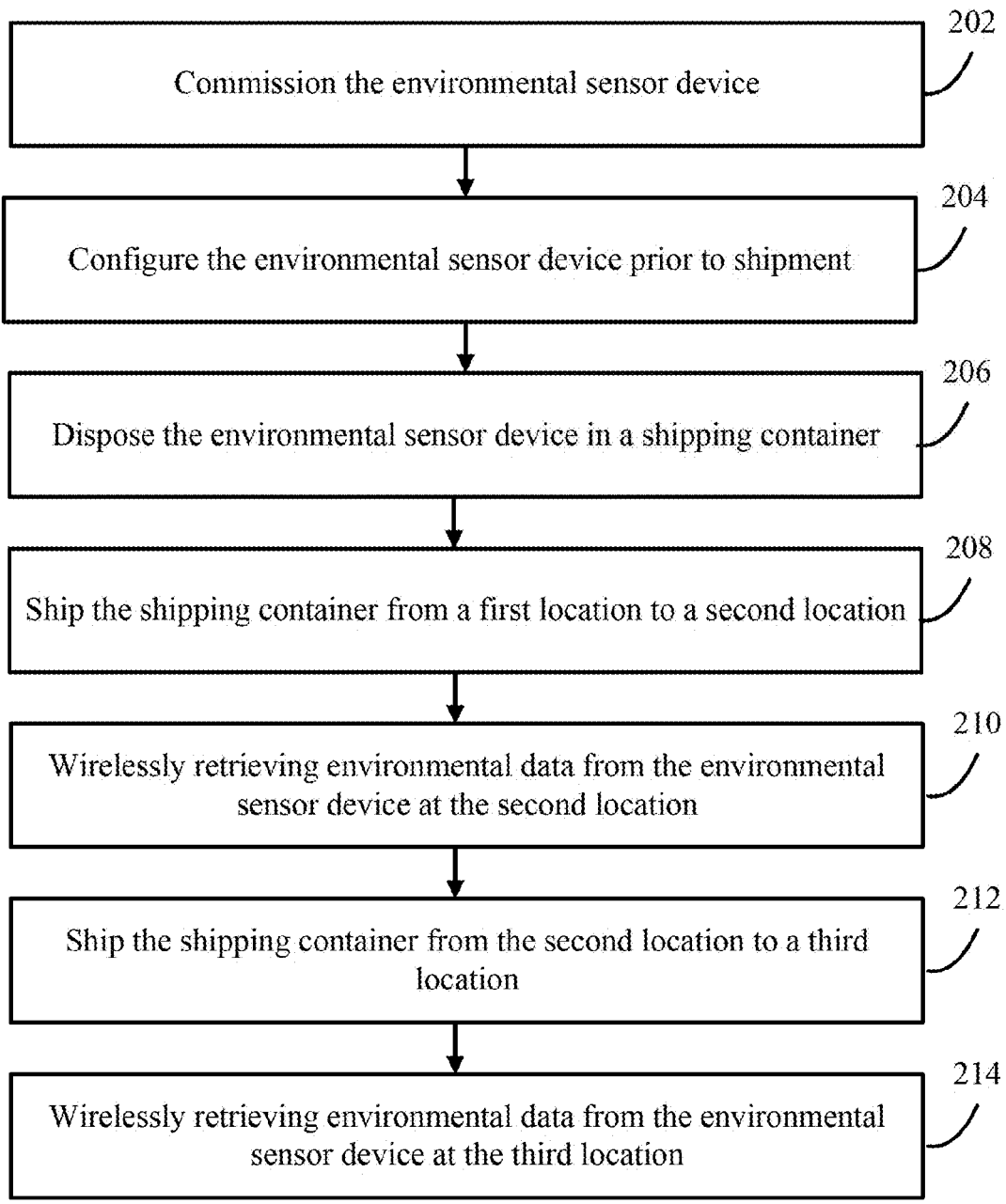
FIG. 2A illustrates a flow chart of a method of shipping a container with an environmental sensor device, in accordance with various embodiments.
Figure 2B:
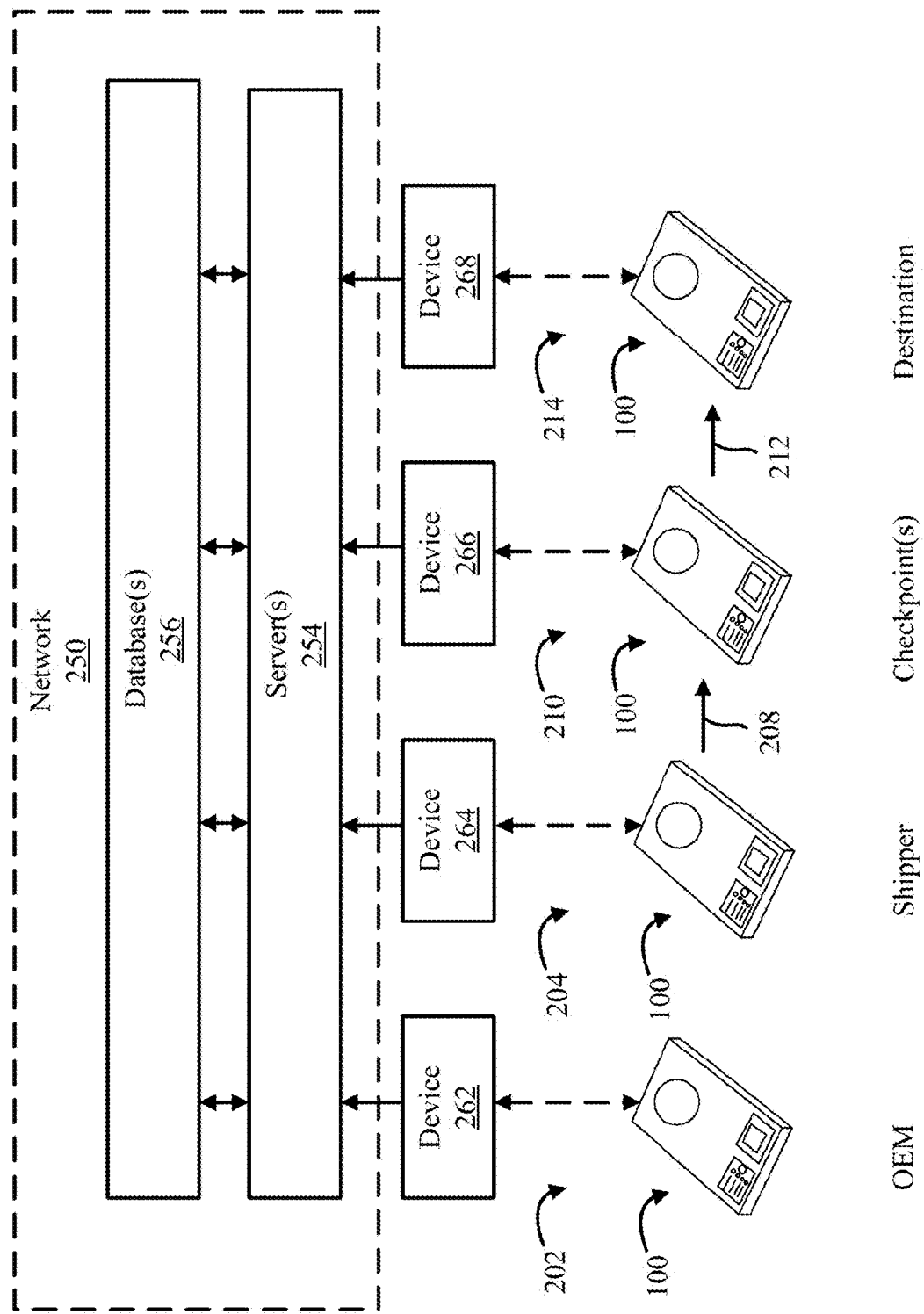
FIG. 2B illustrates an illustrative view of the method from FIG. 2A, in accordance with various embodiments.

Referring now to FIGS. 2A and 2B, a typical initial cycle (e.g., method 200 from FIG. 2A and an illustrative example of method 200 in FIG. 2B) for using the environmental sensor device 100 with a network 250 is illustrated in accordance with various embodiments. The network 250 includes one or more servers 254 and one or more databases 256.

In various embodiments, as described further herein, the method 200 can be utilized for tracking environmental data of any type of container. For example, the method 200 can be utilized for tracking environmental data of a package (e.g., a packaged product, a temperature-controlled product, or the like), in accordance with various embodiments. In various embodiments, the method 200 can be utilized for tracking environmental data for a shipping container (e.g., a twenty-foot shipping container, a forty foot shipping container, a twenty-foot high cube shipping container, or any other container capable of sea, road, and/or rail freight shipping).

In various embodiments, the one or more servers 254 may include application servers (e.g., Azure App Service, WEBSPHERE®, WEBLOGIC®, JBOSS®, POSTGRES PLUS ADVANCED SERVER®, etc.). In various embodiments, the one or more servers 254 may include web servers (e.g., Apache, IIS, GOOGLE® Web Server, SUN JAVA® System Web Server, JAVA® Virtual Machine running on LINUX® or WINDOWS® operating systems).

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, an Android device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any databases (e.g., one or more databases 256) discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT Azure Cosmos® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of uses of various of the environmental sensor device 100 over time, from various tracked shipments, from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

In various embodiments, the method 200 comprises commissioning the environmental sensor device 100 (step 202). As described further herein, during the commissioning process of step 202, the environmental sensor device 100 can test a non-volatile memory (e.g., by performing a write task, a read task, and an erase task of a designated area), test peripherals (e.g., test the one or more sensors by ensuring communication is working and reported values are within expected ranges), generate a public/private key pair (e.g., for use in signing and encryption) and storing both in the non-volatile memory, and loading any device specific data (e.g., unique hardware identification, public key, sensor readings, built-in-self-test results, and/or any other information into the electronic system 300) after signing, compression, encoding (e.g., base64 encoding or the like), and formatting an information block (e.g., for application link reading or the like). The commissioning process of step 202 can be performed by an original equipment manufacturer (OEM). In this regard, functionality of the environmental sensor device 100 can be confirmed prior to first use. In various embodiments, the commissioning process of step 202 can be performed by a device 262 (e.g., a phone, a tablet, a computer, or the like) as described further herein. In various embodiments, upon completion of the commissioning process in step 202 the process can be confirmed complete (e.g., by a status indicator on the environmental sensor device 100, through a graphical user interface on the device 262, or the like). The present disclosure is not limited in this regard.

In various embodiments, during the commissioning step 202, the device 262 communicates with one or more servers 254, which can be in communication with a database of the one or more databases 256 for the network 250 as described further herein. In various embodiments, the one or more servers 254 can include a web server configured for electronic communication with a web browser (e.g., from a device 262, 264, 266, 268), a backend server configured for electronic communication with a specific micro-application associated with the environmental sensor device 100, or the like. The one or more servers 254 can retrieve configuration settings for the environmental sensor device 100 from a database of the one or more databases 256. The configuration setting can comprise sensor sampling rate(s), number of samples per reading for each sensor, an LED flash rate, or the like. The configuration may depend on hardware and firmware revision, as well as a stored serial number in a database of the one or more databases 256. After the commissioning step 202 is completed, the environmental sensor device 100 is ready for use in a shipping process as described further herein.

In various embodiments, in response to commissioning the electronic system 300 in step 202, the controller 310 is further configured to receive, via the communications module 320, a current date and a current time, and update a device date and a device time of the environmental sensor device 100 to the current date and the current time. In this regard, the commissioning step 202 can provide an accurate date and time to the environmental sensor device for internal use by the controller 310 as described further herein.

Accordingly, the method 200 can further comprise configuring the environmental sensor device 100 prior to shipment (step 204). In this regard, a user (e.g., a shipper or the like), can re-configure the environmental sensor device 100 prior to shipping if desired. For example, the shipper can wirelessly communicate with the environmental sensor device 100 (e.g., via a graphical user interface on a device 264 as described further herein) and modify a default configuration from the commissioning step 202. For example, based on an anticipated shipping length, a sampling rate for at least one of the one or more sensors (e.g., one or more sensors 330 from FIG. 3) of the environmental sensor device 100, a sampling size for at least one of the one or more sensors (e.g., one or more sensors 330 from FIG. 3), or the like. In this regard, a sampling rate (i.e., parameter samples per unit time) can be set to a higher value for a shorter anticipated shipment (e.g., air shipping) relative to a longer anticipated shipment (e.g., sea freight shipping), and a sampling size can be adjusted based on desired accuracy or precision. Although described herein as including a configuring step 204 prior to shipping a container with the environmental sensor device 100, the present disclosure is not limited in this regard. For example, a user can utilize the environmental sensor device with the default settings and still be within the scope of this disclosure.

Although described as being configured prior to a shipment in step 204, the present disclosure is not limited in this regard. For example, when the environmental sensor device 100 is used, and associated with, a location (e.g., whether a movable location such as a shipping container location or a stationary location, such as a warehouse location, or the like), as opposed to a package, the environmental sensor device 100 could be configured prior to use. In this regard, the temperature record associated with the environmental sensor device 100 can be associated with a moveable or stationary location, as opposed to with a package, or specific shipment. In various embodiments, the one or more servers 254 can associate the environmental sensor device 100 used in this manner (i.e., to track environmental data of a respective location) with a virtual device. In this regard, the physical environmental sensor device 100 can be replaced without data associated with the that was recorded by the environmental sensor device 100 being lost.

The method 200 further comprises disposing the environmental sensor device 100 in a container (e.g., an internal cavity of a container) (step 206). In various embodiments, the environmental sensor device 100 can be disposed loosely in the container, fixedly coupled to the container, removably coupled to the container or the like. The present disclosure is not limited in this regard. In various embodiments, the environmental sensor device 100 can be disposed within the container in a manner where the environmental sensor device 100 is visible to logistics personnel. In this regard, a portion of the container can include a transparent portion for storing the environmental sensor device 100 for allowing visibility to the environmental sensor device 100 (e.g., for retrieving environmental data at a checkpoint or the like), in accordance with various embodiments. Although described herein as including a transparent portion, the container is not limited in this regard. For example, a container that is entirely opaque is within the scope of this disclosure.

The method 200 further comprises shipping the container from a first location to a second location (step 208). Although illustrated as including a checkpoint the present disclosure is not limited in this regard. For example, the second location can be an end location (i.e., a destination) and still be within the scope of this disclosure. Similarly, the container can travel through various checkpoints without collecting the respective environmental data from the environmental sensor device 100 and still be within the scope of this disclosure as described further herein.

Although described in step 208 as being transported from a first location to a second location, the present disclosure is not limited in this regard. For example, as described previously herein, the environmental sensor device 100 can be utilized in a stationary application (e.g., a warehouse or the like) to track environmental data therein, and still be within the scope of this disclosure.

In various embodiments, the method 200 can further comprise wireless retrieving environmental data from the environmental sensor device at the second location (step 210). In this regard, environmental data can be collected in step 210, transmitted to the one or more servers 254 and stored in a database of the one or more databases 256. Accordingly, a user (e.g., a receiving party of the shipment) may be able to view the environmental data (e.g., through a graphical user interface that is configured to communicate with the one or more servers 254 of the network 250), while the container is in transit, in accordance with various embodiments. In various embodiments, the environmental data can be retrieved at a checkpoint without opening the container. In this regard, any risk of temperature change for the product being shipped may be prevented by facilitating retrieval of the environmental data from the environmental sensor device 100 without opening the container, in accordance with various embodiments.

In various embodiments, in stationary applications, or in movable applications where it is the location's environmental data that is being tracked (e.g., within a shipping container that transfers different packages continually), the environmental data can be retrieved periodically. In this regard, there will be no start or finish of the recording for the environmental sensor device 100. The temperature history of the environmental sensor device 100 (e.g., that is tracked in the one or more servers 254 as a virtual device for reliability without the loss of data) can be updated each time the environmental sensor device 100 is wirelessly connected (e.g., via the communications module 320) to a user device (e.g., device 264, 266, 268). Accordingly, as long as a user (e.g., logistics personnel or the like) retrieves the environmental data more frequently than the circular buffer size (e.g., approximately every 3 months or so in accordance with various embodiments), there would be no gaps in the environmental data history. In various embodiments, the one or more servers 254 could be configured to resolve any overlaps in the environmental data.

In various embodiments, in step 210 the one or more servers 254 can receive a waypoint message (e.g., from a computer-based system on the device 266). The waypoint message can include the unique identifier of the environmental sensor device 100 (e.g., transmitted by the communications module 320 to the device 266) and a geographic location (e.g., as determined by the computer-based system on the device 266). In various embodiments, the geographic location can be input by a user (e.g., a logistics personnel) through a graphical user interface on the device 266. The present disclosure is not limited in this regard. In various embodiments, the geographic location can include a physical address information corresponding to the geographic location. In various embodiments, the waypoint message can contain type information indicating a type of waypoint being recorded. For example, the type information can be selected from a group consisting of "arrival," "transit," or "departure." In various embodiments, at least a portion of the data that is recorded by the one or more servers 254 in the waypoint message can be automatically generated by the computer-based system (e.g., the device 266 can include geographic data, a type of waypoint, a physical address, or the like). Stated another way, because a device 266 (e.g., a mobile device) is used to mark various checkpoints in the method 200 from FIG. 2A, location information can be obtained from the computer-based system (e.g., the micro application, a web browser, or the like) to attach location data upon transmission to the one or more servers 254. The address information can be derived from the latitude and longitude, either by the micro application or by the one or more servers 254 (e.g., if a web browser is used instead of the micro application).

In various embodiments, the method 200 further comprises shipping the container from the second location to a third location (e.g., a final destination) (step 212). Upon receiving the shipment, an end user can open the container, retrieve the product being shipped and place it in an appropriate storage space. Then, the user can retrieve the environmental sensor device 100 from the container and wirelessly retrieve the environmental data from the environmental sensor device 100 and through a device 268 (step 214). In this regard, as described further herein, a user that receives the container can post-process the environmental data of the environmental sensor device 100 (e.g., via a graphical user interface on the device 268) to ensure that the environment of the product being shipped was maintained within desired parameters for an entirety of the shipping process.

In various embodiments, if a shipper tracking number is associated with the recording interval of the environmental sensor device 100, and the tracking information is available from the shipper, the origin and delivery times from the tracking information can be used to demark the start and end times for the recording interval. For example, the one or more servers 254 can be configured to pull the tracking data (e.g., in response to receiving a tracking number from a device 264, 266, 268 during the method 200 from FIG. 2A).

In various embodiments, sender (e.g., via device 264) or receiver (e.g., via device 268) can attach additional information to the recording at the beginning or end of the recording interval. For example, a user can attach photos, a National Drug Code (NDC) associated with the shipment, a Universal Product Code associated with the shipment, one or more lot numbers, serial numbers for the shipped product, or the like. In this regard, the user can input the data manually, or the data can be automatically generated (e.g., in response to scanning relevant documents).

In various embodiments, if a product descriptor is supplied (e.g., UPC or NDC) prior to a shipment, the one or more servers 254 can use that information to derive appropriate temperature thresholds for the recordings. In this regard, data can be displayed relative to these thresholds in step 1010 of process 1000 from FIG. 10 as described further herein.

In various embodiments, if the recording interval start is set through the graphical user interface (e.g., via a micro application, a web page, or another interface), the recording can be marked to automatically complete when an NFC connection is made with the environmental sensor device 100 as described further herein. In this regard, if a shipper knows there will not be any intermediate checkpoints, the shipper can set the recording to end in this manner so that the effort required by the receiver is minimal, and the measurement data is still transmitted to the server and is available to the sender, in accordance with various embodiments.

In various embodiments, if the recording interval start is set by a shipper (e.g., via the device 264 in step 204 from method 200), the starting user can customize the appearance of the web page that appears when the receiver "taps" the device (e.g., in step 214 from method 200). This can include branding, localization, visibility of features, or the like, in accordance with various embodiments.

Referring now to FIG. 3, a schematic view of the environmental sensor device 100 and the electronic system 300 are illustrated, in accordance with various embodiments. The environmental sensor device 100 further comprises a power supply 120. The power supply 120 is electrically coupled to each electronic component of the environmental sensor device 100 (e.g., in the electronic system 300 and other electronic components, such as the one or more status indicators 140 and/or the control input 130). In this regard, the power supply 120 is configured to provide electrical power to each electronic component to facilitate operation of each electronic component in the environmental sensor device 100. In various embodiments, the power supply 120 comprises a rechargeable battery (e.g., a secondary battery), such as a lithium ion, lithium iron phosphate (LFP), silver oxide, or nickel zinc, among other types of rechargeable batteries. In various embodiments, the power supply 120 can be charged and discharged multiple times. However, the present disclosure is not limited in this regard. For example, the power supply 120 can be comprise a primary battery (e.g., a non-rechargeable battery) and still be within the scope of this disclosure.

In various embodiments, the environmental sensor device 100 can further comprises a control input 130. Although described herein as including a control input 130, the present disclosure is not limited in this regard. For example, as described previously herein, the environmental sensor device 100 is configured to continually collect samples (e.g., temperature samples, humidity samples, or the like) in response to receiving power (e.g., from the power supply 120). In this regard, the electronic system 300 can operate without any external input, in accordance with various embodiments. In various embodiments, the control input 130 can be provided to allow a user to demark a starting point for a shipping process (e.g., to demark a point in time just prior to disposing the environmental sensor device 100 in a container in accordance with step 206 from FIGS. 2A and 2B). In this regard, when the control input 130 is provided for an environmental sensor device 100, the control input 130 is in electronic communication with the electronic system 300 (e.g., through a controller 310 as described further herein) to allow the starting point to be demarked by the controller 310, in accordance with various embodiments.

The electronic system 300 comprises the controller 310, a communications module 320, and one or more sensors 330. The controller 310 is electrically coupled, and in operable communication with, the one or more sensors 330 and the communications module 320. In this regard, the controller 310 is configured to receive environmental data (or any other data) from the one or more sensors 330, such as temperature measurements, light measurements, pressure measurements, or the like, and aggregate the measurements received from the one or more sensors 330. In various embodiments, the communications module 320 can be configured to transmit data from the electronic system 300 (e.g., through a transmitter or a transceiver), receive data to provide to the controller 310 (e.g., through a receiver or a transceiver), or the like. The present disclosure is not limited in this regard.

In an assembled state of the environmental sensor device 100, the controller 310 is electrically coupled to the power supply 120. In various embodiments, the power supply 120 automatically powers on the electronic system 300 in response to assembling the environmental sensor device 100 (i.e., an electrical circuit is created by electrically coupling the power supply 120 to the electronic system 300 and other electronic components of the environmental sensor device 100). For example, in response to electrically coupling the power supply 120 to the electronic system 300, the controller 310 can be configured to automatically begin continually collecting samples (e.g., temperature samples, humidity samples, or the like) in accordance with the process 400 from FIG. 4 as described further herein. Stated another way, responsive to receiving power from the power supply 120, and while the power is maintained, the controller 310 of the electronic system 300 can be configured to continually collect samples (e.g., temperature samples, humidity samples, or the like) from respective sensor (e.g., one or more temperature sensors 332 or one or more humidity sensors 336) in a circular buffer to form a circular buffer data set as described further herein. In this regard, the environmental sensor device 100 can be configured to operate immediately after assembly at an original equipment manufacturer (OEM). In various embodiments, by having the power supply 120 automatically powering the electronic system 300 and other electronic components (e.g., the one or more status indicators 140) in response to being installed, a user may not have to interact with the environmental sensor device 100 in order to facilitate operation of the environmental sensor device 100. In this regard, the environmental sensor device 100 can essentially be mistake proofed, since a user would not be capable of being accidently shipping the environmental sensor device 100 in an off state.

The controller 310 is electrically coupled, and in operable communication with, the one or more sensors 330 and the communications module 320. In this regard, the controller 310 is configured to receive environmental data (or any other data) from the one or more sensors 330, such as temperature readings, light readings, pressure readings, humidity readings, or the like, and transmit the environmental data through the communications module 320 (e.g., during step 210 and/or step 214 from FIGS. 2A and 2B). As referred to herein, a "reading" of a sensor refers to a measurement or a calculation of a parameter associated with the sensor. In this regard, each of the one or more sensors 330 disclosed herein can either directly measure a parameter associated with the sensor or measure other parameters and calculate the parameter associated with the sensor. The present disclosure is not limited in this regard. The controller 310 can be further configured to aggregate the readings received from the one or more sensors 330. For example, a single reading from a sensor can be susceptible to error. However, by aggregating a plurality of readings over a specified time period, a sample can be calculated that provides a more accurate depiction of the measured parameter over the respective time period.

In various embodiments, the communications module 320 can be configured to transmit data from the electronic system 300 (e.g., through a transmitter or a transceiver), receive data to provide to the controller 310 (e.g., through a receiver or a transceiver), or the like. In this regard, the communications module 320 can facilitate the commissioning step 202, and the environmental data retrieval steps (e.g., steps 210, 214 from FIG. 2A), as described further herein.

In various embodiments, the communications module 320 can include a Bluetooth® system (e.g., a Bluetooth® beacon, a low-energy Bluetooth® beacon, or the like) and/or a near-field communication (NFC) system (e.g., an NFC tag, or the like). In various embodiments, the communications module 320 can include the Bluetooth® subsystem 322 and the NFC subsystem 324, only one of the Bluetooth® subsystem 322 and the NFC subsystem 324, or the like. The present disclosure is not limited in this regard. In various embodiments, the wireless interface 160 of the environmental sensor device 100 from FIG. 1 can provide an indicator for a user to identify a proximate location of a communications module 320 disposed within the housing 110. For example, to facilitate NFC communication with the NFC system a user device may have to be placed in closer proximity to the NFC subsystem 324, in accordance with various embodiments.

In various embodiments, the near-field communication (NFC) tag of the NFC subsystem 324 in the communications module 320 can be aligned with the wireless interface (e.g., the wireless interface 160 on the housing 110 from FIG. 1) within the housing 110 and configured to communicate with a user device (e.g., a phone, a tablet, a computer, an NFC reader, or the like). In this regard, a user can identify a proximate location to hold the user device to facilitate transferring environmental data from the environmental sensor device 100, in accordance with various embodiments. Although described herein as including an NFC tag, the present disclosure is not limited in this regard. For example, the communications module 320 can include only a Bluetooth® beacon or a low-energy Bluetooth® beacon and still be within the scope of this disclosure.

In various embodiments, controller 310 may be integrated into a microcontroller disposed within the electronic system 300. In various embodiments, controller 310 can be configured as a central network element or hub to access various systems and components of the electronic system 300. Controller 310 may comprise a network, computer-based system, and/or software components configured to provide an access point to various systems and components of electronic system 300. In various embodiments, controller 310 may comprise one or more processors 312. In various embodiments, the one or more processors 312 of the controller 310 may be a single processor. In various embodiments, controller 310 is implemented as, and may include, one or more processors 312 and/or one or more tangible, non-transitory memories and be capable of implementing logic (e.g., one or more memories 314). Each processor in the one or more processors 312 can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. Controller 310 may comprise one or more processors 312 configured to implement various logical operations in response to execution of instructions, for example, instructions stored on a non-transitory, tangible, computer-readable medium configured to communicate with controller 310 (e.g., one or more memories 314).

In various embodiments, the one or more sensors 330 comprises one or more temperature sensors 332 (e.g., a negative temperature coefficient (NTC) thermistor, a resistance temperature detector (RTD), a thermocouple, a semiconductor-based sensor, or the like). In various embodiments, the one or more sensors 330 comprises a light sensor 334 (e.g., an ambient light sensor, photodiodes, photoresistors, phototransistors, photovoltaic light sensors, or the like). In various embodiments, the one or more sensors 330 can comprise one or more humidity sensor(s) 336 (e.g., a capacitive humidity sensor, a resistive humidity sensor, a thermal conductivity humidity sensor, or the like).

In various embodiments, the one or more temperature sensors 332 comprises a single temperature sensor. However, the present disclosure is not limited in this regard. For example, the one or more sensors 330 could include a plurality of temperature sensors (e.g., disposed in different areas of a container if temperature gradients are anticipated, for redundancy, or the like). In various embodiments, each of the one or more temperature sensors 332 is configured to periodically take readings (e.g., temperature measurements or calculations for a temperature sensor, light measurements for a light sensor, humidity measurements or calculations, or the like). The readings from each of the one or more temperature sensors 332 and/or humidity sensors 336 can be stored within a memory buffer of the controller 310. In various embodiments, light measurements from the light sensor 334 can be provided to the controller 310. In this regard, based on the light measurements provided by the light sensor 334, the controller 310 can detect when a respective container has been opened (e.g., in response to illuminance increasing above a threshold level or above a threshold rate of increase).

In various embodiments, the controller 310 is configured to receive an indication that the control input 130 has been engaged (e.g., a button has been pressed, a switch has been flipped, a knob has been rotated, or the like). In response to receiving an indication that the control input 130 has been engaged, the controller 310 can be configured to record a timestamp associated with the indication. In this regard, the timestamp can be provided to a user (e.g., after a shipment process in accordance with the method 200 from FIGS. 2A and 2B) as an indication of when the environmental sensor device 100 was placed in the container (e.g., in step 206), or taken out of the container, in accordance with various embodiments.

Figure 4:
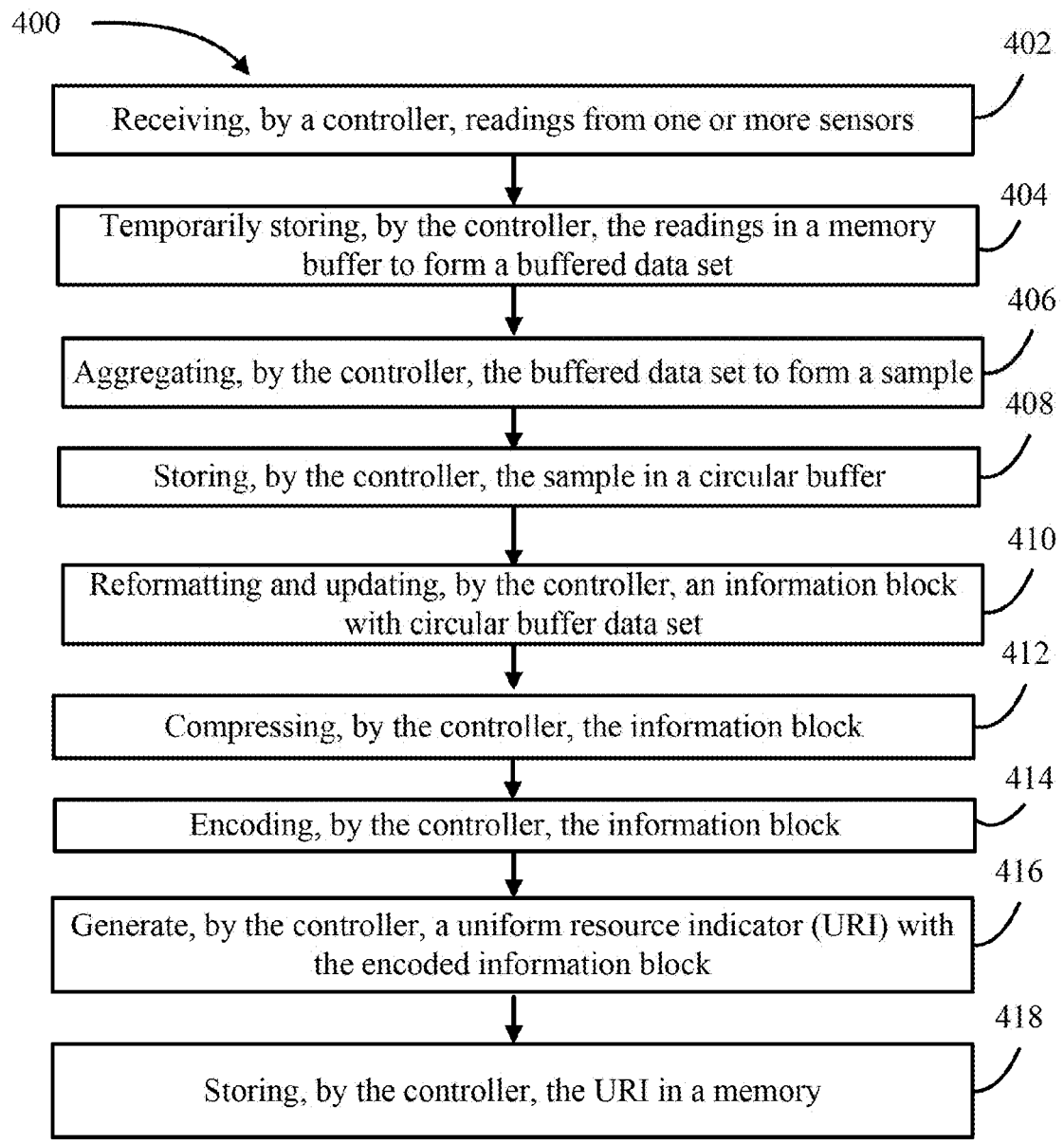
FIG. 4 illustrates a process performed by the electronic system of FIG. 3, in accordance with various embodiments.

Referring now to FIG. 4, a process 400 that is continually performed by the electronic system 300 (e.g., by the controller 310) of the environmental sensor device 100 from FIG. 3, is illustrated, in accordance with various embodiments. With combined reference to FIGS. 3 and 4, the process 400 comprises receiving, by the controller 310, readings (e.g., temperature readings, humidity readings, or the like) from one or more sensors 330 (e.g., one or more temperature sensors 332, one or more humidity sensors 336, and/or any other environmental sensor) (step 402), and temporarily storing the readings in a memory buffer to form a buffered data set (step 404). In this regard, each temperature sample, as described further herein, can be calculated based on the buffered data set. In various embodiments, the memory buffer in step 404 of the one or more memories 314 that receives the readings (e.g., temperature readings and/or humidity readings) is a linear memory buffer of the controller 310 with a data size Y (i.e., a maximum data size for the memory buffer). The size Y corresponds to a number of readings that can be stored in the memory buffer. In various embodiments, the size Y for humidity samples can be different or the same as the size Y for temperature samples. The present disclosure is not limited in this regard.

The process 400 further comprises aggregating, by the controller 310, the buffered data set to form a sample (e.g., a temperature sample, a humidity sample, and/or any other type of environmental data sample) (step 406). In this regard, the controller 310 (e.g., by the one or more processors 312) can periodically calculate a sample based on the buffered readings stored in the memory buffer (e.g., via an aggregation function). For example, the controller 310 can periodically calculate a temperature sample from buffered temperature readings stored in the memory buffer, the controller can periodically calculate a humidity sample from buffered humidity readings stored in the memory buffer (or another memory buffer), or the like. In various embodiments, the aggregation function of step 406 can be a simple average, a weighted average, or any other calculation known in the art, based on X number of readings corresponding to a readings data size. X number of readings can be equal to Y or less than Y, the present disclosure is not limited in this regard. In various embodiments, X can be customizable by a user (e.g., a user can modify X through a GUI on a user device in step 204 from FIGS. 2A and 2B), which can be transmitted to the controller 310 through the communications module 320). In various embodiments, the number of readings X for humidity samples can be different or the same as the number of samples X for temperature samples. The present disclosure is not limited in this regard.

The process 400 further comprises storing, by the controller 310, the sample (e.g., a temperature sample, a humidity sample, or the like) in a circular buffer (step 408). Stated another way, the controller 310 is configured to store the temperature sample calculated from the buffered data set in step 406 in the circular buffer after the sample (e.g., temperature sample, humidity sample, or the like) is calculated. In this regard, in response to a circular buffer not being full, the sample can be placed after the prior sample stored in the circular buffer. In response to the circular buffer being full, the sample can overwrite the oldest sample of the circular buffer. In various embodiments, the sample (e.g., a calculated or aggregated temperature sample, humidity sample, or the like) can be added to a circular buffer of the controller 310 that has a data size Z (i.e., a maximum data size for the circular buffer) in step 408. In various embodiments, the maximum data size of the linear buffer (i.e., data size Y) is less than the maximum data size for the circular buffer (i.e., data size Z). for example, the linear buffer is configured to temporarily store readings for the one or more sensors 330 until a threshold number of readings are obtained. In contrast, the circular buffer stores a number of samples that can correspond to various length shipping lengths. Accordingly, by having a greater data size for the circular buffer, more samples can be stored relative to a number of temporary readings, in accordance with various embodiments.

The process 400 further comprises reformatting and updating, by the controller 310, an information block with a circular buffer data set that was updated in accordance with step 408 (step 410). Stated another way, in response to the sample being added to the circular buffer, an information block, which is configured to be transmitted to a user device as described further herein, is reformatted and updated to include updated values from the circular buffer. In this regard, the updated values include the sample calculated in step 406. In various embodiments, the reformatting and updating the information block can further include the controller 310 transmitting the circular buffer data set to a communications buffer. In various embodiments, in response to the transmitting, the controller 310 can include a timestamp associated with transmitting the circular buffer data set to the communications buffer. The timestamp can be based on an elapsed period of time from a device date and a device time that was created (or updated) during the commissioning step 202 of the method 200 from FIG. 2A as described previously herein. Accordingly, in response to transmitting the circular buffer data set to the communications buffer, the controller 310 can record the timestamp associated with the transmission to provide an end user with the timestamp of the most recent update to the circular buffer for use in post-shipping analysis, in accordance with various embodiments. In this regard, in response to the connecting to a device (e.g., device 266 in step 210 from FIGS. 2A and 2B and/or device 268 in step 214 from FIGS. 2A and 2B) at any time after the transmitting the circular buffer data set to the communications buffer and prior to transmitting an updated circular buffer data set, the timestamp is automatically transmitted in the information block to the device. In various embodiments, the information block can further include any timestamps recorded during method 200 from FIGS. 2A and 2B. For example, a timestamp to demark a beginning of a shipment process may be recorded in response to engaging the control input 130 of the environmental sensor device 100 as described previously herein. Similarly, an end of the shipping method 200 from FIGS. 2A and 2B can be demarked by engaging the control input 130. In response to a respective point in time being demarked, the timestamp can be transmitted to the information block to be transmitted to a user device (e.g., in step 210 or 214 of method 200), as described further herein.

In various embodiments, in response to a new sample being created in step 406, the information block is reformatted (or recreated) in step 410 as described previously herein to contain all the sensor samples that are stored in the circular buffer (e.g., from step 408), plus any timestamp data that was previously recorded associated with any control input 130 engagement or the like, light data corresponding to the one or more light sensors 334 (e.g., any change in light ranges as described in process 500), and/or any other data described herein. In this regard, the information block is reformatted in step 410 and loaded into an NFC buffer of the NFC subsystem 324 and configured for transmission to a user device, as described further herein. Although the NFC subsystem 324 is described herein as including its own buffer, the NFC buffer can be a component of the controller 310 (e.g., an element of the one or more memories 314), and still be within the scope of this disclosure. In this regard, the NFC buffer can be a specific buffer that is configured to store the information block that is configured to be transmitted to a user device (e.g., devices 264, 266, 268 from FIG. 2B), in accordance with various embodiments.

In various embodiments, the information block can include various informational elements related to the environmental sensor device 100. For example, the information block can include a hardware diagnostic status, a battery level for the power supply 120, a unique hardware identification associated with the environmental sensor device 100, timestamps associated with control input 130 engagement, total time since restart (e.g., in seconds, minutes, or the like), total time since the circular buffer was cleared (e.g., in seconds, minutes, or the like), an access token (e.g., for authenticating future operations), a temperature sample record (e.g., as stored in the circular buffer), a humidity sample record (e.g., as stored in the circular buffer), light data from the light sensor 334, a sample index (e.g., a number of temperature samples and/or a number of humidity samples stored in the circular buffer), and/or a total number of data transmissions since a restart of the environmental sensor device 100 (e.g., through the NFC subsystem 324 of the communications module), or the like.

If the number of temperature samples in the circular buffer is below Z after the updated temperature sample is stored (or added), the information block will be updated with all the prior recorded temperature samples and the new temperature sample. However, if the number of temperature samples in the circular buffer prior to adding the new temperature sample is equal to Z, the oldest temperature sample would be removed, and the new temperature sample would take its place in the circular buffer, in accordance with various embodiments. In various embodiments, the information block can also contain additional data, such as device identifiers, authentication keys, or the like that were provided during the commissioning step 202 from FIGS. 2A and 2B as described previously herein.

In various embodiments, the process 400 further comprises compressing, by the controller 310, the information block (step 412). In this regard, by compressing the information block in step 412, the environmental data can be transmitted more efficiently during a transmission step (e.g., steps 210, 214 from FIGS. 2A and 2B), in accordance with various embodiments. Although described herein as including a compression step 412, the present disclosure is not limited in this regard. For example, the information block can be transmitted in an un-compressed state and still be within the scope of this disclosure. In various embodiments, by compressing the information block in step 412, a data size of the information block can be reduced. In this regard, a time to transmit the data from the environmental sensor device 100 to a user device (e.g., device 264, 266, 268 from FIG. 2B) can be reduced, in accordance with various embodiments.

In various embodiments, the process 400 can further comprise signing the information block from step 410 with the private key as described further herein prior to the compressing of step 412. In this regard, the cryptographic signature can be appended to the information block, which can be verified by the one or more servers 254 of network 250 from FIG. 2B in response to the information block being transmitted thereto, in accordance with various embodiments.

In various embodiments, the process 400 further comprises encoding, by the controller 310, the information block (step 414). For example, the controller 310 can encode the compressed data (or un-compressed data) into a standard format (e.g., a base 64 string or the like). In this regard, binary data can be transformed into printable characters that can be used in places where binary data would cause data loss or other errors. Although encoding may increase a data size, the encoding step in step 414 is configured to allow eventual formatting as a standard web query as described further herein, which facilitates an ease of processing and storing the environmental data upon transmission to a user device, as described further herein, in accordance with various embodiments.

In various embodiments, the encoding of step 414 can further include performing a second encoding step to encode the standard format (e.g., a base64 string or the like) using a uniform resource locater (URL) encoding. In this regard, by further encoding the information block using URL, the URL encoding can convert special characters from the standard format into special sequences that are recognized by web servers and converted back, in accordance with various embodiments.

In various embodiments, the process 400 further comprises generating, by the controller 310, a uniform resource identifier (URI) (i.e., a web address) by appending a URL encoded information block from step 414 to a URL prefix (step 416). In this regard, the information block can be formatted as a web address. In various embodiments, the URI includes a URL prefix with the URL encoded information block disposed thereafter. In various embodiments, in step 416, the controller 310 can append an NFC data exchange format (NDEF) record header to the URI indicating that the URI is an HTTPS link address. In various embodiments, in response to generating the URI in step 416, the URI is stored in a memory of the one or more memories 314 (e.g., an NFC buffer or the like) (step 416). In this regard, if a user "taps" the environmental sensor device 100 with a user device (e.g., device 264, 266, 268 from FIG. 2B) prior to the information block being reformatted again in step 410, the URI from step 418 is transmitted through the NFC subsystem 324 to the user device as described further herein, in accordance with various embodiments.

Figure 10:
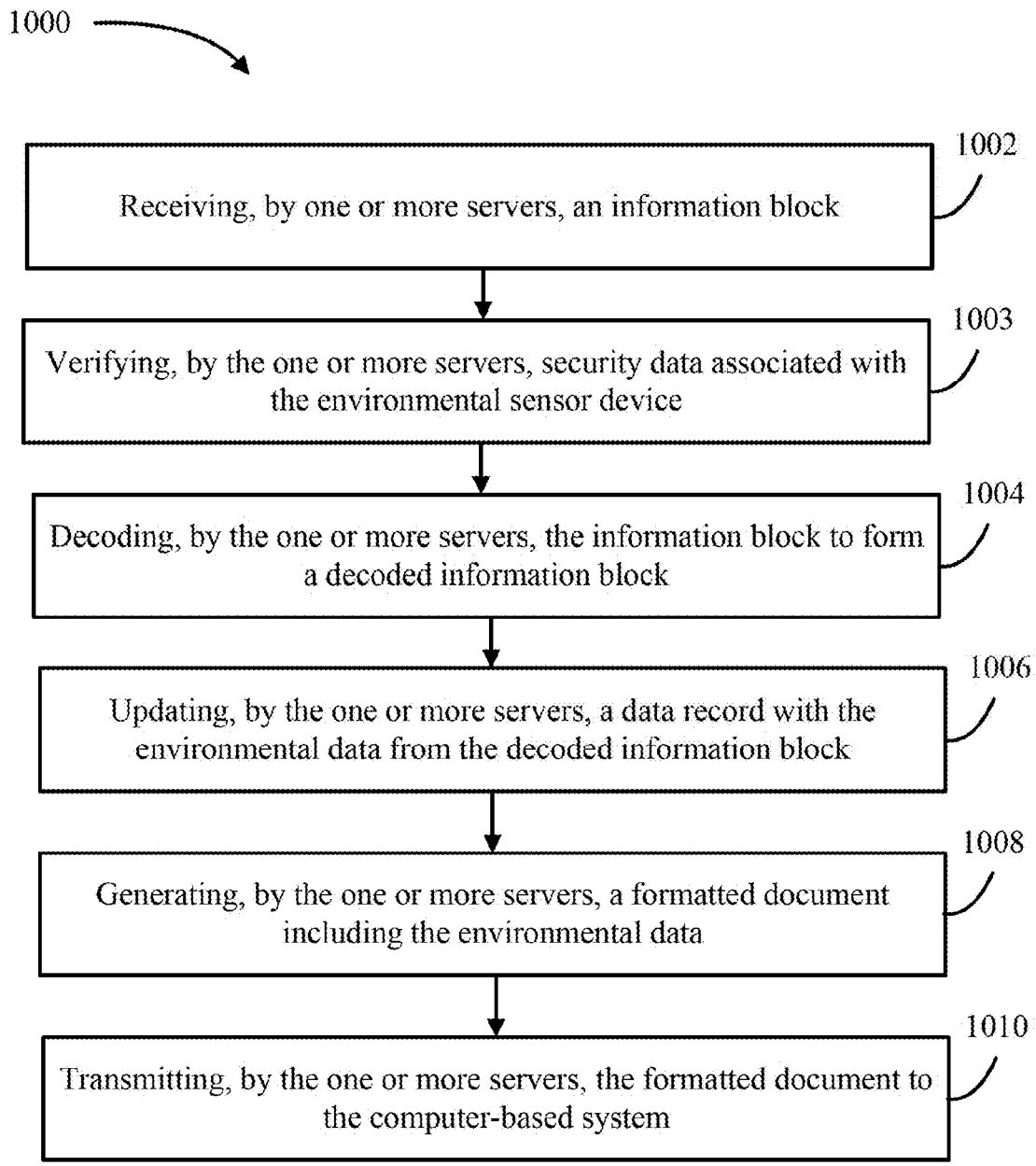
FIG. 10 illustrates a process performed by one or more servers of a computer-based system, in accordance with various embodiments.

In various embodiments, in response to the information block to a computer based system (e.g., on a device 264, 266, 268 from FIG. 2B) through the communications module 320 of the electronic system 300, opening of the web address generated in step 414 of process 400 cause data associated with the information block to be sent to the one or more servers 254 (e.g., a web server), which uses the one or more servers (e.g., a backend server) to process the data (e.g., in accordance with process 1000 from FIG. 10 as described further herein). In this regard, in response to the device 264, 266, 268 receiving the information block generated and stored in steps 414 and 416 of process 400 (e.g., via the communications module 320), the information block causes the device 264, 266, 268 to display data associated with the information block (e.g., which was continually collected by the environmental sensor device 100) through a graphical user interface as described further herein.

Figure 5:
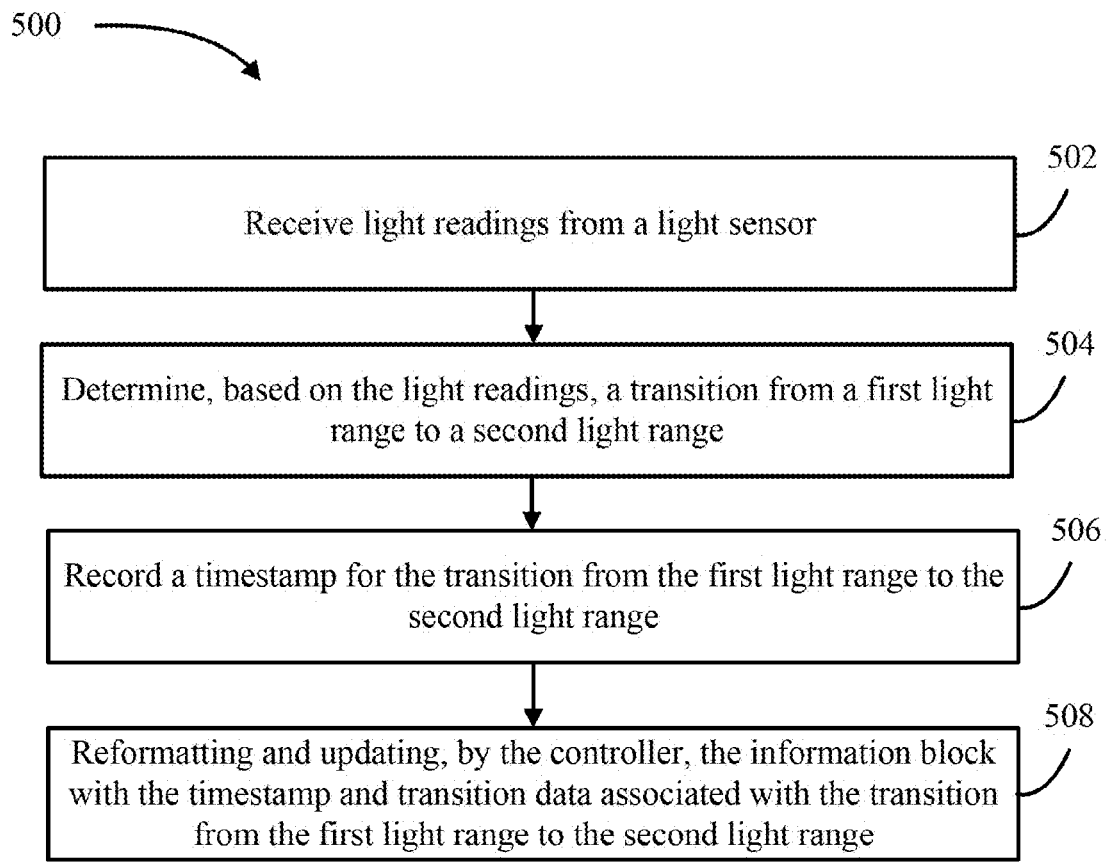
FIG. 5 illustrates a process capable of being performed by the electronic system of FIG. 3, in accordance with various embodiments.

Referring now to FIG. 5, a process 500 capable of being performed by the controller 310 of the environmental sensor device from FIG. 3 is illustrated, in accordance with various embodiments. In various embodiments, the process 500 can be performed when the environmental sensor device includes a light sensor 334. With brief reference to FIG. 3, although described herein as including a light sensor 334, the present disclosure is not limited in this regard. For example, the environmental sensor device 100 can be without a light sensor 334 and still be within the scope of this disclosure. For example, temperature readings from the one or more temperature sensors 332 can be sufficient for determining if and when a container has been opened (i.e., based on a change in a temperature range as described further herein). However, by having a light sensor 334, and the process 500 described further herein, whether a container was opened or not during transit can be confirmed, whereas utilizing temperature data, the container being opened would be more speculative.

With combined reference now to FIGS. 3 and 5, the process 500 can comprise receiving, by the controller 310, light readings (e.g., measured or calculated) from the light sensor 334 (step 502). In various embodiments, in contrast with temperature readings from the one or more temperature sensors 332 and/or the humidity readings from the one or more humidity sensors 336, the light readings need not be aggregated into samples, which are then stored in a circular buffer. Data associated with the light readings is meant to detect a change in state of the container (e.g., a change from a closed state to an open state). Accordingly, collecting and storing light samples would utilize additional storage space unnecessarily. However, if desirable, the light samples could be collected in a similar manner to the temperature samples and/or humidity samples as described previously herein.

In various embodiments, the process 500 further comprises determining, by the controller 310 and based on the light readings, a transition from a first light range to a second light range (step 504). For example, a light range between 0 and 0.001 lux may correspond to a closed container, a light range between 0.001 lux and 180 lux may correspond to a warehouse, a light range between 180 lux and 1,000 lux may correspond to a typical indoor environment, and a light range of greater than 1,000 lux may correspond to an outdoor environment. In this regard, based on the light readings transitioning from one range to another, (i.e., from the closed container range to the warehouse range), the controller 310 can determine (or estimate) that the container was opened in a warehouse, in accordance with various embodiments. In various embodiments, the light ranges can be configurable (e.g., via a user in step 204 from FIG. 2A, via a manufacturer during a commissioning process, or the like). The present disclosure is not limited in this regard.

In various embodiments, the process 500 further comprises recording, by the controller 310 and based on the determining the transition in step 504, a timestamp for the transition from the first light range to the second light range and any corresponding data to the transition (e.g., transition data) (step 506). In various embodiments, the transition data can include light readings before and after the transition, an estimated event (e.g., exposed to warehouse light, indoor light, outdoor light, or the like), an estimated time period that the container was opened, or the like. The present disclosure is not limited in this regard. Various types of data that would be relevant to a receiver of sensitive material based on light data and transition between light ranges could be readily envisioned by one skilled in the art and would still be within the scope of this disclosure.

In various embodiments, the process 500 further comprises reformatting and updating, by the controller 310, the information block with the timestamp and the transition data associated with the transition from the first light range to the second light range (step 508). In this regard, the transition data and the timestamp are configured to be transmitted with the information block to a user device (e.g., in step 210 and/or step 214 of method 200 from FIG. 2A) to provide a user with data corresponding to a potential opening of the container, in accordance with various embodiments.

Figure 6A:
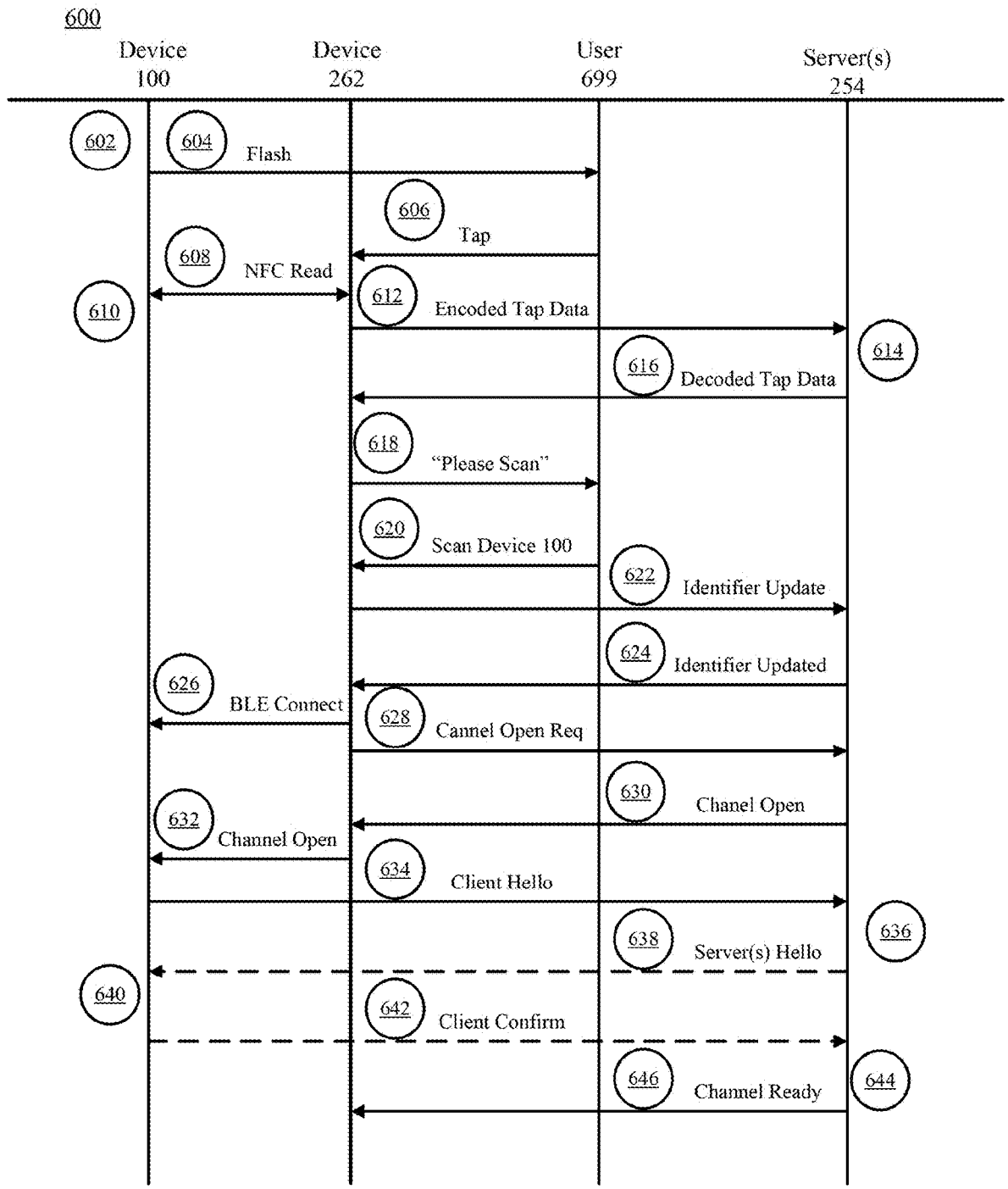
FIG. 6A illustrates a portion of a commissioning process for the electronic system of the environmental sensor device from FIG. 3, in accordance with various embodiments.
Figure 6B:
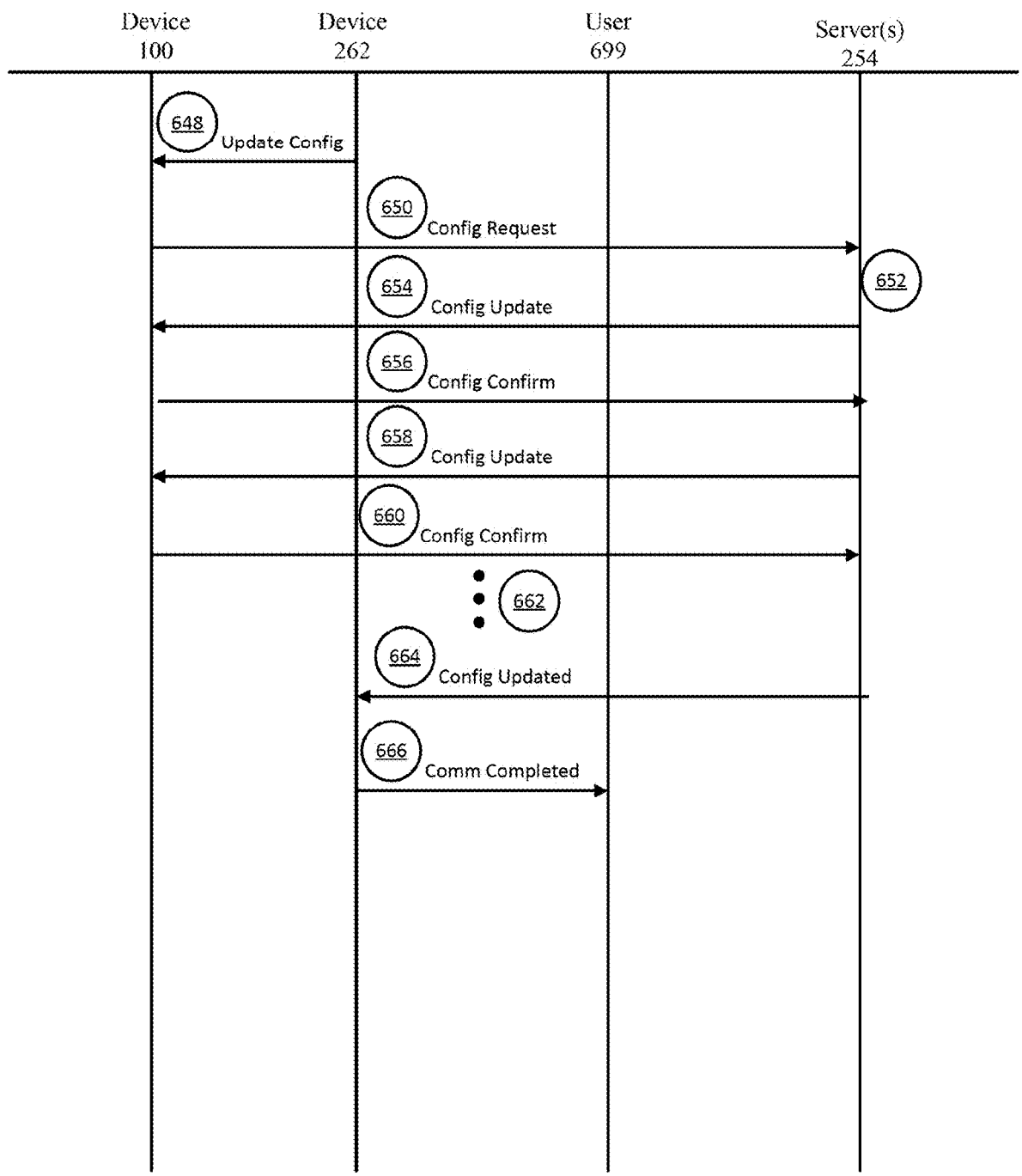
FIG. 6B illustrates a portion of a commissioning process for the electronic system of the environmental sensor device from FIG. 3, in accordance with various embodiments.

Referring now to FIGS. 6A and 6B, a commissioning process 600 (e.g., from step 202 of method 200 from FIG. 2A) for the environmental sensor device 100 is illustrated, in accordance with various embodiments. With brief reference to FIG. 3, upon assembling the environmental sensor device 100, and electrically coupling the power supply 120 to the electronic system 300 and other electronic components (e.g., control input 130 and/or one or more status indicators 140), the controller 310 of the electronic system 300 is configured to execute a commissioning task (e.g., process 600 from FIGS. 6A and 6B).

In various embodiments, as described further below, the commissioning process 600 comprises receiving, by the one or more servers 254, an encoded tap data during a commissioning task (step 612); decoding, by the one or more servers 254, the encoded tap data to form a decoded tap data which is transmitted back to a computer based system on a device 262 (step 616); generating, by the one or more servers, a data record for the environmental sensor device 100 associated with a unique identifier (step 614); and generating, by the one or more servers, an initial data record for the environmental sensor device associated with the unique identifier in response to determining the unique identifier does not match a stored unique identifier (step 614). In this regard, in response to performing the commissioning process 600, the one or more servers 254 can generate an initial data record associated with the environmental sensor device (e.g., if one is not already created) to be utilized by the one or more servers 254 after a shipping process (e.g., to be updated in accordance with process 1000 from FIG. 10 as described further herein), in accordance with various embodiments. In various embodiments, as described further below, the one or more servers 254 transmit the decoded tab data to the computer-based system on device 262, wherein in response to the unique identifier not matching any of the plurality of stored unique identifiers, the transmitting further includes an indication that the environmental sensor device 100 is a newly commissioned device. In various embodiments, as described further below, the process 600 includes receiving, by the one or more servers 254, an initial tap data including an initial information block (e.g., encoded tap data from step 612), and commissioning, by the one or more servers 254 and through a channel opened by the one or more servers 254 (e.g., in steps 626, 628, 630, 632), the environmental sensor device 100, wherein in response to the commissioning the environmental sensor device 100 (e.g., through process 600), operational settings of the environmental sensor device 100 is updated, a date and time of the environmental sensor device 100 is updated, and future communications between the environmental sensor device and the one or more servers 254 are encrypted.

With combined reference to FIGS. 2B, 3, and 6A, the process 600 (e.g., for commissioning step 202 from FIG. 2A) comprises performing, by the environmental sensor devices, a built-in self test (step 602). For example, the controller 310 of the environmental sensor device 100 tests the one or more memories 314 (e.g., the non-volatile memory) and testing peripherals (e.g., the one or more sensors 330). In this regard, the controller 310 can is configured to test, by the controller 310, one or more memories 314 (e.g., a non-volatile memory) by performing each of a read operation, a write operation, and an erase operation of a designated area of the one or more memories 314 (e.g., the non-volatile memory). The built-in self-test of step 602 can further comprise testing, by the controller 310, for electronic communication with the one or more sensors 330 (e.g., the one or more temperature sensors 332, the light sensor 334, the one or more humidity sensors 336, and/or any other sensors disposed within the housing 110 of the environmental sensor device 100) by obtaining sensor readings from the each of the one or more sensors 330 and comparing the sensor readings to an expected value range for each of the sensor readings.

In various embodiments, the process 600 further comprises generating, by the controller 310, a test result in response to the testing in step 602, wherein the test result indicates successfully passing the testing or failures associated with the one or more memories 314, the communications module 320, and/or the one or more sensors 330. In this regard, based on the test results, the controller 310 can command the one or more status indicators 140 to provide an indication to a user 699 of the built-in self-test from step 602 (step 604). For example, a red-green-blue sequence can indicate a successful built-in self-test, while other combinations can indicate various failures. In various embodiments, the one or more status indicators 140 of the environmental sensor device 100 can continue to flash a green light in step 604 at periodic intervals until the user 699 initiates a remainder of the commissioning process 600 in the next step (e.g., step 606).

If the commissioning user (e.g., user 699) sees a success indication via the one or more status indicators 140, the user 699 can "tap" the environmental sensor device 100 (e.g., proximate the wireless interface 160 from FIG. 1) with a device 262 from FIG. 2B (e.g., a phone, a tablet, or the like) that has a commissioning micro-application installed thereon (step 606). The commissioning micro-application may be part of an end user application (e.g., for use on the device 268 from FIG. 2B by an end user) or it may be a separate micro-application. The present disclosure is not limited in this regard. If the commissioning process functionality is a component of the end-user micro application, the commissioning functionality of the micro-application would only be available to certain users (e.g., OEMs or the like), which could be determined by login credentials, in accordance with various embodiments.

In various embodiments, as described further herein, components, modules, and/or engines of network 250 from FIG. 2B may be implemented as micro-applications or micro-apps. Micro-apps are typically deployed in the context of a mobile operating system, including for example, a WINDOWS® mobile operating system, an ANDROID® operating system, an APPLE® iOS operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In response to the user 699 performing the tap step 606, the device 262 from FIG. 2B (e.g., a mobile phone) reads an NFC buffer of the NFC subsystem 324 and passes it through the device 262 to the commissioning micro-application (e.g., via a respective operating system) (step 608). In response to the controller 310 of the environmental sensor device 100 detecting the NFC read step (e.g., step 608), the controller 310 instructs the Bluetooth® subsystem 322 to advertise a Bluetooth® beacon (e.g., a BLE beacon or the like), so that the mobile phone can connect to the environmental sensor device 100 (e.g., through the Bluetooth® subsystem). In various embodiments, the BLE beacon can be configured to stop after a preset time period. In this regard, if a user 699 does not connect via Bluetooth® communications to the environmental sensor device 100, life of the power supply 120 can be preserved (e.g., battery life). In various embodiments, step 610 can be performed later in the process 600. The present disclosure is not limited in this regard.

In various embodiments, in response to step 608, encoded tap data, received by the device 262 (e.g., a commissioning device) from the environmental sensor device 100 is transmitted to the one or more servers 254 (e.g., one or more backend servers) of the network 250 (step 612). In response to the one or more servers 254 receiving the encoded tap data, the one or more servers 254 decode the encoded tap data and retrieve (e.g., from the decoded tap data) unique hardware identification associated with the environmental sensor device 100 (step 614). If the encoded tap data is compressed, step 612 further includes decompressing the encoded tap data. However, the present disclosure is not limited in this regard. For example, the encoded tap data can be transmitted in an uncompressed form and still be within the scope of this disclosure. The one or more servers 254 can then compare the unique hardware identification with a plurality of records stored in a database of the one or more databases 256 of the network 250. If the one or more servers 254 does not find a record of the unique hardware identification associated with the environmental sensor device 100, the one or more servers 254 can create a new record and store the sensor readings from the tap data, as well as any additional data received from the environmental sensor device 100 in the newly created record within a database of the one or more databases 256. If the one or more servers 254 does find a record associated with the unique hardware identification, the one or more servers 254 can store the tap data in the associated record by overwriting data that was previously stored in the associated record, in accordance with various embodiments. In this regard, the environmental sensor device 100 can be re-commissioned for multiple uses, in accordance with various embodiments.

In various embodiments, the process 600 further comprises transmitting, by the one or more servers 254, the decoded tap data back to the commissioning micro application on the device 262 (step 616). In response to determining the environmental sensor device 100 was a newly commissioned device (and not being re-commissioned) in step 614, the one or more servers 254 can also send an indication to the commissioning micro-application an indication that the environmental sensor device 100 is a new device.

In response to the commissioning micro-application receiving the indication that the device is a new device, the process 600 further comprises, generating, by the commissioning micro-application, a prompt for the user 699 to scan a unique identifier (e.g., unique identifier 150 from FIG. 1) of the environmental sensor device 100 (step 618). In various embodiments, the unique identifier 150 can correspond to a barcode, a serial number, a QR code, or any other identifying code, in accordance with various embodiments.

The user 699 then scans the unique identifier on the environmental sensor device 100 (e.g., through the commissioning micro-application) (step 620), and responsive to the scanning in step 620, the commissioning micro-application confirms the unique identifier is a valid serial number and transmits the unique identifier to the one or more servers 254 (step 622). The one or more servers 254 can then store the unique identifier (e.g., in the record from step 614 in the one or more databases 256) and send a confirmation back to the commissioning micro-application on the device 262 (step 624).

In this regard, steps 622 and 624 as described herein can include receiving, by the one or more servers, a physical unique identifier from the computer-based system of the device 262; determining, by the one or more servers, the physical unique identifier and a manufactured unique identifier associated with the environmental sensor device 100 in a list of manufactured unique identifiers match; and storing, by the one or more servers 254, a serial number associated with the physical unique identifier in the data record (e.g., within the one or more databases 256 from FIG. 2B).

In various embodiments, if the user 699 did not previously establish a Bluetooth® connection from step 610, the commissioning micro-application can initiate a wireless (e.g., Bluetooth® low energy) connection between the device 262 and the communications module 320 of the environmental sensor device 100 to allow security data (e.g., key information) and/or configuration settings to be exchanged (step 626). The commissioning micro-application then sends a request to the one or more servers 254 to open a secure channel (step 628). The one or more servers 254 responds with an indication that a channel is open (step 630). The commissioning micro-application then transmits a BLE message to the environmental sensor device 100 (e.g., through the communications module 320) indicating that the communication channel with the one or more servers 254 is open.

In various embodiments, once the secure channel is established, the environmental sensor device 100 transmits (e.g., through the communications module 320) security data to the one or more servers 254, which passes through the commissioning micro-application (step 634). The security data can include a public key and a random number (e.g., a private key). In various embodiments, the public/private key may have been generated by the controller 310 in response to the power supply 120 being coupled thereto in step 602.

In response to the one or more servers 254 receiving the security data message, the one or more servers 254 check that the public key has not been stored yet (e.g., if the security data is capable of encryption). If it has been previously stored (i.e., if the environmental sensor device 100 is being re-commissioned), the new value must match the stored value. The one or more servers 254 then creates its own random number, and then retrieves (or creates) a server public/private key pair. The server key pair may be global, or it may be unique for each device. The present disclosure is not limited in this regard. The one or more servers 254 then uses the server private key, the device public key, the device random number and the server random number to create a shared secret (step 636).

In various embodiments, if the one or more servers 254 is capable of encryption, the one or more servers 254 transmit the data security message (e.g., containing the server public key, the server random number, and a signature of the server public key) to the environmental sensor device 100 (e.g., through the communications module 320) (step 638). The signature can be generated, by the one or more servers 254, by signing the server public key with the server root private key. The root key pair can be global for a respective client. If the one or more servers 254 is not capable of encryption, it skips the key generation and goes directly to sending a "Channel Ready" message to the commissioning application in step 646 as described further herein.

In response to the environmental sensor device 100 receiving the data security message (e.g., a "Server Hello" message), if the environmental sensor device 100 is capable of encryption, the controller 310 of the environmental sensor device 100 verifies the signature of the server public key using the server root public key, which is part of the device software (step 640). The controller 310 of the environmental sensor device 100 then generates the shared secret using the device private key, the server public key, the device random number and the server random number. If the environmental sensor device 100 is not capable of encryption, the controller 310 performs no calculations. In various embodiments, in step 640, the controller 310 of the environmental sensor device 100 is configured to generate a private key and a public key paired with the private key and generate a unique hardware identification number.

If the environmental sensor device 100 received the security data message and is capable of encryption, the controller 310 sends an encrypted confirmation message (e.g., through the communications module 320) to the one or more servers 254 (step 642). The encrypted confirmation message contains components of the previous messages in steps 634 and 638. If the environmental sensor device 100 received the data security message from the one or more servers 254 in step 638, but is not capable of encryption, it sends a negative acknowledgement (NACK) message to the one or more servers 254.

If the one or more servers 254 receives a data security confirmation message in step 642, the one or more servers 254 decrypts the message and verifies its contents (step 644). If the contents are correct, the one or more servers 254 marks the key exchange as complete and further messages are encrypted before sending. If the one or more servers 254 receives a NACK message, it verifies whether unencrypted communication is allowed before proceeding.

In various embodiments, the process 600 further comprises transmitting, by the one or more servers 254, a "Channel Ready" message to the commissioning micro-application on the device 262, with an indication of whether the channel is encrypted (step 646). Then, the commissioning micro-application sends an "Update Configuration" command to the environmental sensor device 100 (e.g., through the communications module 320) (step 648).

The environmental sensor device 100 then sends a configuration request to the one or more servers 254 through the secure channel established in steps 626, 628, 630, 632 (step 650). The one or more servers 254 retrieves the configuration for the environmental sensor device 100 (e.g., from one or more databases 256) (step 652). The configuration comprises items such as sensor sampling rate for each of the one or more sensors 330, number of samples per reading for each of the one or more sensors 330, an LED flash rate (e.g., for the one or more status indicators 140). The configuration may depend on hardware and firmware revision, as well as the stored serial number retrieved previously in the process 600, in accordance with various embodiments.

The process 600 further comprises transmitting, by the one or more servers 254, the determined configuration to the environmental sensor device 100 (step 654). The environmental sensor device 100 then transmits a confirmation for receipt of the configuration settings to the one or more servers 254 (step 656). If further configuration messages are needed, the one or more servers 254 sends the next configuration message to the environmental sensor device 100 (step 658). If a second configuration message was sent by the one or more servers 254, the environmental sensor device 100 sends a confirmation message (step 660). 31. The configuration exchange is repeated until all configuration is sent to the environmental sensor device 100 from the one or more servers 254, and the one or more servers receives the last confirmation message (step 662).

The process 600 further comprises the one or more servers 254 transmitting a configuration complete message to the commissioning micro-application on the device 262 (step 664), which can be displayed through a graphical user interface of the micro-application on the device 262 to indicate to the user 699 that the process is complete (step 666). Accordingly, the environmental sensor device 100 can be ready for use in a remainder of the method 200 as shown and described in FIGS. 2A and 2B previously herein, in accordance with various embodiments.

Stated another way, and in accordance with various embodiments, steps 648-664 can comprise receiving, by the one or more servers 254, an update configuration request, retrieving, by the one or more servers 254, configuration settings from a database in the one or more databases 256 from FIG. 2B, and transmitting by the one or more servers and through the channel, the configuration settings to the environmental sensor device 100. In various embodiments, the initial settings may be modified by a user 699 based on a shipment duration or the like, as described further herein, in accordance with various embodiments.

In various embodiments, after or during the commissioning process 600, a user 699 can update configuration settings on the environmental sensor device 100. For example, via a graphical user interface on the device 262, a user 699 can select a sampling rate of the circular buffer (e.g., a sampling rate for the one or more temperature sensors 332 and/or a sampling rate for the one or more humidity sensors 336), a maximum data size of the circular buffer, or the like. In this regard, in response to updating configuration settings through the device 262, the controller 310 can receive, through the communications module 320, a configuration update request, and responsive to the configuration update request, adjust at least one of a sampling rate of the circular buffer from a first sampling rate to a second sampling rate, and a maximum data size of the circular buffer from a first data size to a second data size. Although described as occurring during the commissioning process 600, the present disclosure is not limited in this regard. For example, the configuration settings can be adjusted prior to shipping in step 208 of method 200, after a shipment at step 214 (e.g., for a next shipment), or the like.

Figure 7A:
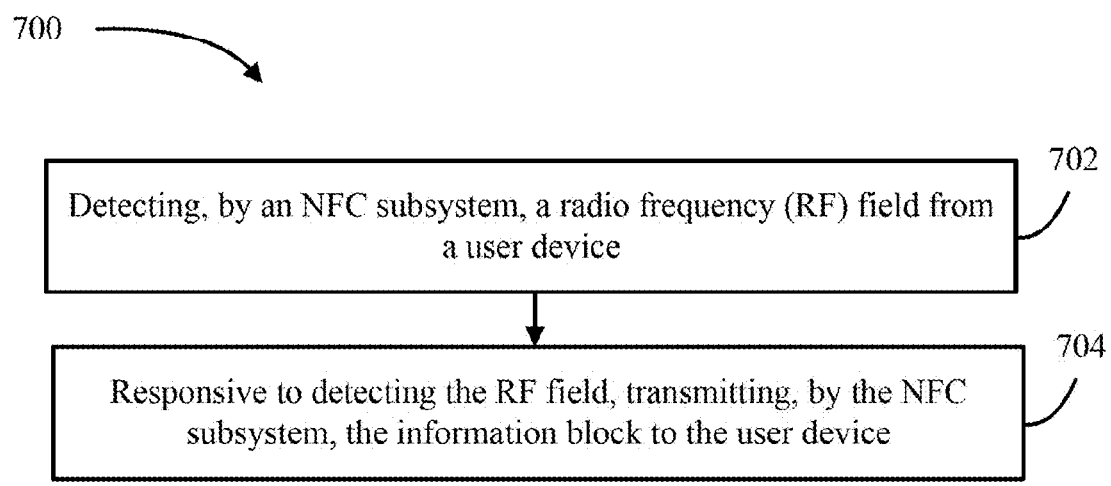
FIG. 7A illustrates a process performed by the electronic system of the environmental sensor device from FIG. 3, in accordance with various embodiments.

Referring now to FIG. 7A, a process 700 performed by the electronic system 300 of the environmental sensor device 100 from FIG. 3 is illustrated, in accordance with various embodiments (e.g., during step 210 and/or step 214 of method 200 from FIG. 2A). With combined reference now to FIGS. 2B, 3, and 7A, the process 700 comprises detecting, by an environmental sensor device and through an NFC subsystem 324 of the communications module 320, a radio frequency ("RF") field being transmitted from a device 264, 266, 268 (e.g., a user device, such as a phone, a tablet, or any other device capable of communicating with the communications module 320) (step 702). Stated another way, when a device 264, 266, 268 (e.g., a smartphone, a tablet or the like) is held near the environmental sensor device 100, a radiated RF field in the device 264, 266, 268, causes the environmental sensor device (e.g., through the NFC subsystem 324 of the communications module 320) to transmit an NFC (near-field communication) message, which is received by the device 264, 266, 268 and passed to the computer based system for processing. The user device includes the computer-based system (e.g., an operating system) installed therein. In various embodiments, responsive to detecting the device 264, 266, 268, the NFC subsystem 324 of the communications module transmits the information block (e.g., in the URI from step 418 in process 400) to the device 264, 266, 268 (step 704). As described previously herein, the information block can include environmental data (e.g., temperature samples, humidity samples, light data, sample index(es) number of taps since a restart or commissioning, device data, or the like). In various embodiments, the information block is transmitted as an NDEF message.

In various embodiments, the computer-based system parses the NDEF message and recognizes that the message includes a URI based on the NDEF header described previously herein. In this regard, the computer-based system (e.g., the operating system) of the device 264, 266, 268 queries the website associated with the URI for a specific file that lists which applications are permitted to open the link, based on the path of the link. The details of this process can vary somewhat between particular operating systems (e.g., Android or iOS operating systems), but the fundamentals are the same. In various embodiments web browsers, such as Safari or Chrome, are available as an alternative. If a corresponding micro-application is installed on the device 264, 266, 268, the computer-based system (e.g., the operating system) can query the user whether to open the link with the micro application or with a web browser. However, the present disclosure is not limited in this regard. For example, the computer-based system (e.g., the operating system) can automatically open the micro-application in response to detecting the micro-application is installed on the device 264, 266, 268, in accordance with various embodiments. Accordingly, the computer-based system is configured to pass the URI to the micro-application for processing (e.g., after a URL decoding) in response to a user selecting the micro-application for use, or automatically in response to the micro-application being installed therein, in accordance with various embodiments.

Figure 7B:
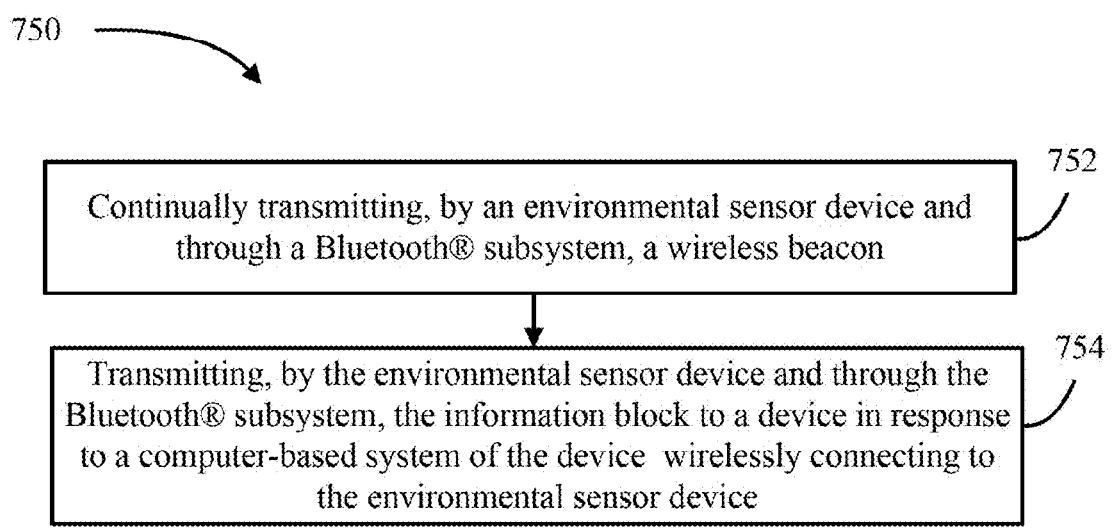
FIG. 7B illustrates a process performed by the electronic system of the environmental sensor device from FIG. 3, in accordance with various embodiments.

Although described herein as utilizing the NFC subsystem 324 of the electronic system 300 for transmitting the information block from step 410 to a user device (e.g., device 264, 266, 268 from FIG. 2B), the present disclosure is not limited in this regard. For example, the Bluetooth® subsystem 322 can be configured to continually send out beacons (e.g., BLE beacons or the like). For example, with reference now to FIG. 7B, a process 750 performed by the electronic system 300 of the environmental sensor device 100 from FIG. 3 is illustrated, in accordance with various embodiments (e.g., during step 210 and/or step 214 of method 200 from FIG. 2A). With combined reference now to FIGS. 2B, 3, and 7B, the process 750 comprises continually transmitting, by an environmental sensor device and through a Bluetooth® subsystem 322 of the communications module 320, a wireless beacon (e.g., a Bluetooth® low energy beacon or the like) (step 752).

In various embodiments, the process 750 further comprises transmitting, by the environmental sensor device and through the Bluetooth® subsystem 322 of the communications module, the information block generated in step 410 of the process 400 from FIG. 4 to the device 264, 266, 268 in response to a computer-based system of the device 264, 266, 268 wirelessly connecting to the environmental sensor device 100 (step 754). In various embodiments, the computer-based system configured to connect and upload the information block can be the micro-application described previously herein. In this regard, steps 414, 416, 418 of process 400 can be eliminated by sending the information block directly to the micro-application. However, by utilizing the Bluetooth® subsystem, the environmental data would not be able to be decoded and displayed to a user (e.g., in accordance with process 1000 from FIG. 10 as described further herein), unless the micro-application is installed on a user device. In various embodiments, by utilizing the Bluetooth® subsystem 322 for transmitting the information block from step 410 of the process 400, the user device can be further away from the environmental sensor device, relative to the process 700 of FIG. 7A that utilizes the NFC subsystem 324.

Figure 8:
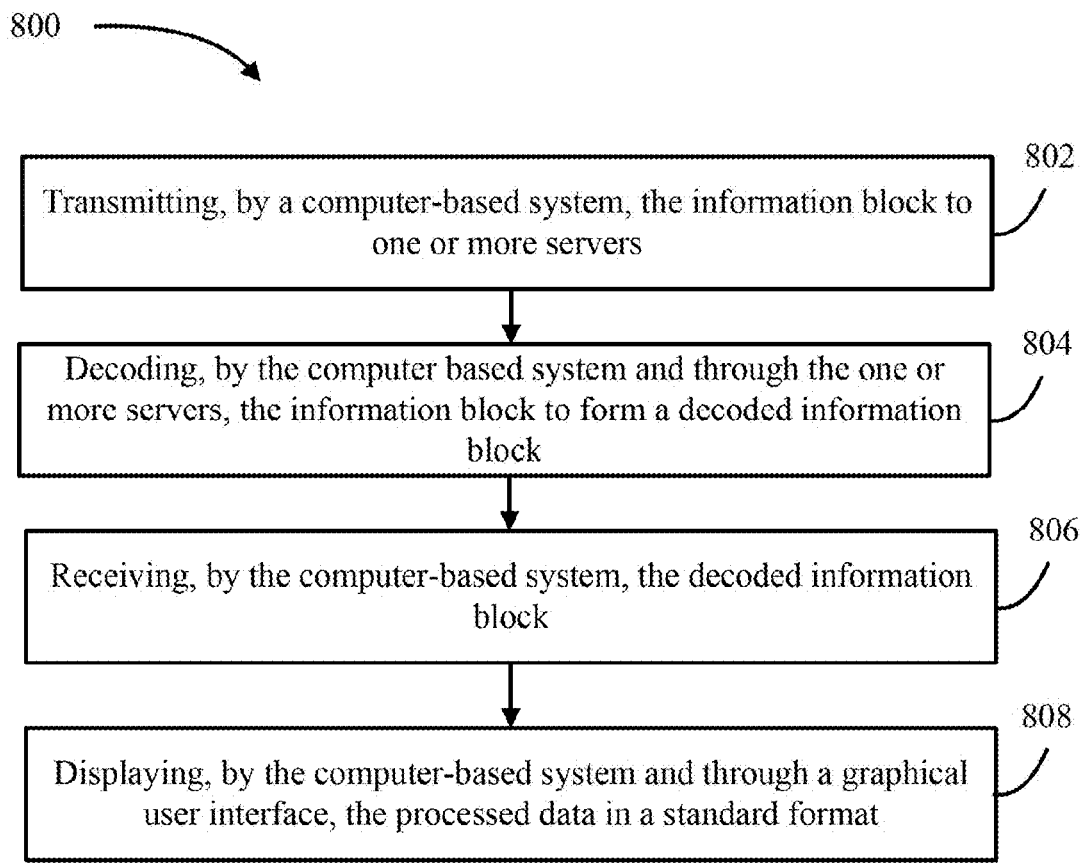
FIG. 8 illustrates a process performed by a computer-based system in response to an information block being transmitted to the computer-based system, in accordance with various embodiments.
Figure 9B:
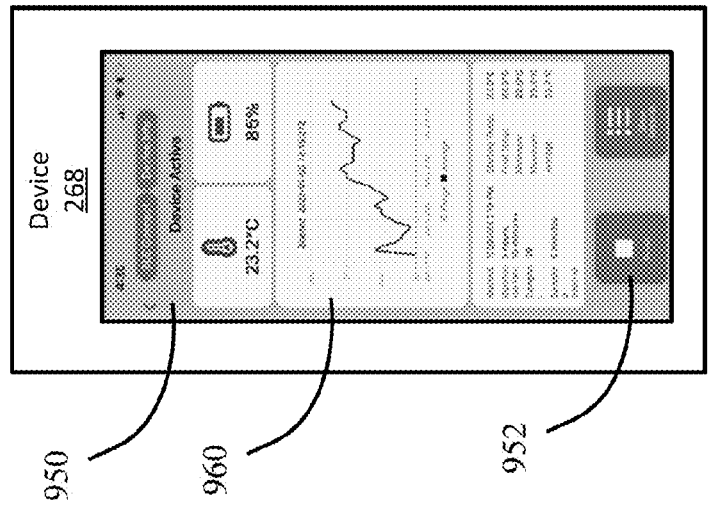
FIG. 9B illustrates a graphical user interface on a micro application that is generated from the process of FIG. 8, in accordance with various embodiments.
Figure 9A:
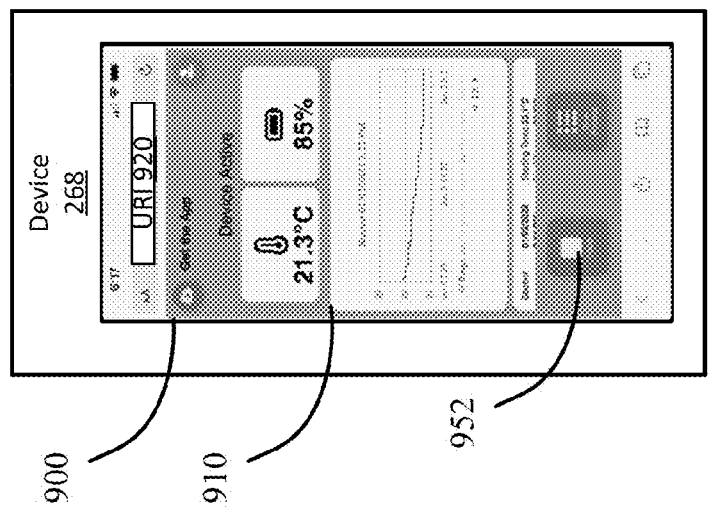
FIG. 9A illustrates a graphical user interface on a web browser that is generated from the process of FIG. 8, in accordance with various embodiments.

With reference now to FIG. 8, and in accordance with various embodiments, in response to the computer-based system (e.g., the operating system) of the device 264, 266, 268 receiving the URI with the information block in accordance with process 700, the computer based system of the device 264, 266, 268 automatically performs the following steps: transmitting, via the computer-based system, the information block to the one or more servers 254 (e.g., a backend server or the like) for decoding (step 802); decoding, via the computer-based system and through one or more servers 254, the information block to form a decoded information block (step 804); receiving, via the computer-based system, the decoded information block, the decoded information block including the temperature sample data set (step 806); and displaying, via the computer-based system through one of a web page (e.g., a graphical user interface 900 generated from a web browser 910 based on the URI 920 as shown in FIG. 9A) or a micro-application (e.g., a graphical user interface 950 generated from the micro-application based on the URI as shown in FIG. 8B) the processed data in a standard format.

In various embodiments, if the information block received by the device 264, 266, 268 from FIG. 2B is processed by the micro-application, the micro-application extracts a data query parameter value from the URI, which corresponds to the encoded information block that was generated by the environmental sensor device 100 in step 414 of the process 400 from FIG. 4. The encoded information block is then transmitted to the one or more servers 254 of the network 250 from FIG. 2B in step 802.

In response to the one or more servers 254 of the network 250 from FIG. 2B receiving the encoded information block, the one or more servers 254 decode the information block in step 804. In this regard, the one or more servers 254 can perform the following steps for decoding: decode the encoded information block from base64 form to binary data; expand (e.g., if the encoded information block is compressed) the information block; verify a cryptographic signature using the public key of the environmental sensor device 100 described previously herein, which was stored in a database of the one or more databases 256 in the commissioning process 600 from FIGS. 6A and 6B; and parsing and storing individual information elements for processing.

In step 806, the decoded information block is transmitted from the one or more servers back to the user device (e.g., to the operating system), and the operating system causes the user device to display environmental data from the decoded information block in a standard format (e.g., a JSON-formatted document or the like) in step 808. In this regard, the micro application, as shown in FIG. 9B, can be configured to present the environmental data to the user via the graphical user interface 950, which can include data inputs (e.g., actions) that the user can take. For example, the data inputs can include a finish action, which can end a data recording associated with a shipping process (e.g., in step 214 from FIG. 2A).

In various embodiments, the process 800 of FIG. 8 is similarly performed if the micro-application is not installed on a user device. However, prior to performing step 802, a web browser of the computer-based system on the user device can launch a query to the one or more servers, which as a response downloads a small computer program (e.g., a JavaScript program or the like) to the web browser, which then runs the computer program. The computer program may also be known as a single-page application (SPA). The SPA, after receiving the URI from the web browser, can transmit the encoded information block to the one or more servers 254 for decoding and processing in accordance with step 804.

In the displaying step 808, the SPA can present the information received back from the one or more servers 254 in a graphical user interface 900 as shown in FIG. 9A, including actions the user can take (e.g., data inputs 952), similar to the actions available via the micro application as shown in FIG. 9B.

Referring now to FIG. 10, a process 1000 for processing temperature data of an environmental sensor device, capable of being performed by the one or more servers 254 of the network 250 from FIG. 2B is illustrated, in accordance with various embodiments. With combined reference now to FIGS. 2B and 10, the process 1000 comprises receiving, by one or more servers 254, encoded data from a computer-based system (e.g., on a device 264, 266, 268) that transmits the encoded data in response to receiving an information block (e.g., in accordance with process 700 from FIG. 7) with a Uniform Resource Identifier and the encoded data, the encoded data including environmental data (step 1002). The environmental data can correspond to data in the electronic system 300 from FIG. 3 in accordance with the process 400 described previously herein.

In various embodiments, the process 1000 further comprises verifying, by the one or more servers 254, a public key of the environmental sensor device 100 from the information block and a stored public key on the one or more servers are matching, wherein the stored public key is stored during commissioning of the environmental sensor device 100 (step 1003). Although illustrated as performing the verifying step prior to decoding in step 1004, the present disclosure is not limited in this regard. For example, the one or more servers 254 can decode the information block in step 1004 and subsequently verify the security data thereafter and still be within the scope of this disclosure, in accordance with various embodiments.

In various embodiments, the process 1000 further comprises decoding, by the one or more servers 254, the encoded data to form a decoded data block (step 1004). In this regard, the one or more servers 254 decode the encoded information block (e.g., received from the environmental sensor device in step 704 from process 700 of FIG. 7) and as similarly described in step 804 of process 800.

In various embodiments, the electronic system 300 of the environmental sensor device 100 includes a timestamp, equivalent to the number of elapsed seconds since the commissioning of the environmental sensor device 100 in the environmental data. When the one or more servers 254 decodes the information block in step 1004, the included timestamp can be compared with the previous stored version. The environmental data that is decoded can be discarded if the timestamp is not greater than the timestamp on the previous information block received. If the timestamp is greater than the previous timestamp, the new environmental data that is decoded can replace the old and be processed as described further herein.

In various embodiments, the process 1000 further comprises updating a data record (e.g., within with the environmental data from the decoded data block) (step 1006). In various embodiments, the data record updated in step 1006 is stored within the one or more databases 256 and associated with a unique identifier for the environmental sensor device 100 (e.g., the unique identifier that is provided to the one or more servers 254 during the commissioning process 600 from FIGS. 6A and 6B described previously herein). In this regard, the data record that was created during the commissioning process 600 from FIGS. 6A and 6B can be updated based on matching the unique identifier received in the information block (e.g., the decoded information block) with the unique identifier stored in the one or more databases 256 from the commissioning process 600 from FIGS. 6A and 6B and storing the environmental data from the decoded information block therein.

In various embodiments, the process 1000 further comprises generating, by the one or more servers 254, a formatted document including the environmental data (step 1008); and transmitting, by the one or more servers 254, the formatted document to the computer-based system (e.g., on a device 264, 266, 268) (step 1010). In this regard, in response to the computer-based system receiving the formatted document, the computer-based system can generate a graphical user interface (e.g., graphical user interface 900 generated from a web browser 910 as shown in FIG. 9A or graphical user interface 950 generated from a micro-application 960 as shown in FIG. 9B). In various embodiments, the formatted document includes visual displays of environmental data. For example, the formatted document can include a most recent sample (e.g., temperature sample, humidity sample, or the like), a current battery level of the power supply 120 from FIG. 3, a graphical display of samples overtime, a demarked start time of a shipment, a duration of a shipment, a number of samples recorded since a demarked start time, a sampling rate, and/or relevant sample data over the duration of the shipment (e.g., a starting temperature (and/or humidity), a final temperature (and/or humidity), a minimum temperature sample (or humidity sample), a maximum temperature sample (or humidity sample), an average temperature sample (or humidity sample), or any other relevant environmental data that a user may be interested in), in accordance with various embodiments.

In various embodiments, a user can demark an endpoint of a shipment process by engaging a data input in the one or more data inputs 952 (e.g., a finish button or the like). In this regard, the data record from step 1006 can be updated in response to the user engaging the data input of the one or more data inputs 952, in accordance with various embodiments.

In various embodiments, the process 1000 occurs after the computer based system (e.g., on the device 264, 266, 268) receives a Uniform Resource Identifier (e.g., generated by the environmental sensor device 100 in step 416 as described previously herein) from wireless communication with the environmental sensor device (e.g., in step 210 or step 214 of method 200 from FIG. 2B), and automatically transmits the information block to the one or more servers 254 (e.g., based on the Uniform Resource Identifier and as described in process 800 from FIG. 8). In this regard, the computer-based system on the device 264 receives the Uniform Resource Identifier from the environmental sensor device 100 and automatically transmits an encoded information block to the one or more servers (e.g., in accordance with step 802 from process 800) to initiate the process 1000, in accordance with various embodiments. Accordingly, as described previously herein, by performing the decoding step 1004 on the one or more servers 254 (e.g., a backend server or the like) as opposed to through a micro application, environmental data from the environmental sensor device 100 can be more secure, and a user can view the environmental data without the respective micro-application (e.g., through a web browser 910 as shown in FIG. 9A), in accordance with various embodiments.

In various embodiments, in response to the computer-based system receiving the Uniform Resource Identifier, a data query parameter including the information block is extracted from the Uniform Resource Identifier. In this regard, the data query parameter can be generated by the environmental sensor device 100 during step 414 of process 400 as described previously herein. In this regard, the data query parameter includes the encoded information block, which can then be extracted from the Uniform Resource Identifier by the one or more servers 254 in accordance with the process 1000.

In various embodiments, the process 1000 can further comprise generating, by the computer-based system and based on permissions associated with a user of the computer-based system, data input actions (e.g., one or more data inputs 952 as shown in FIGS. 9A and 9B) through the graphical user interface. In this regard, based on a point in the method 200 from FIG. 2B, a respective user (e.g., a logistics personnel, a shipper, a receiver of a shipment, or the like) may desire to provide an input related to the shipment. For example, a start time can be provided by a shipper through a device 264 a shown in FIG. 2B, an end time of the shipment can be provided by at a destination through a device 268, or the like. Similarly, a shipper can update configuration settings through the device 264 prior to disposing the environmental sensor device 100 in a respective container in accordance with step 206 of method 200 from FIG. 2B, in accordance with various embodiments.

In various embodiments, and with brief reference to FIGS. 9A and 9B, the graphical user interface comprises one or more data inputs 952, and in response to selecting a data input in the one or more data inputs (e.g., after a shipment has arrived at a destination to an end user and through a device 268 from FIG. 2B), an end timestamp for data collection associated with the environmental data can be generated. However, the present disclosure is not limited in this regard. For example, timestamps can be generated in response to transmitting the information block wirelessly in steps 210 or 214 of the method 200 from FIG. 2B. In this regard, a user can select that a timestamp associated with a transmission is an end timestamp associated with the data collection and would still be within the scope of this disclosure.

In various embodiments, the process 1000 can further comprise receiving, by the one or more servers 254, a first message indicating a start timestamp of a recording period, the first message containing the unique identifier of the environmental sensor device and the start timestamp of the recording. In various embodiments, the first message is received prior to receiving the information block in step 1002. In this regard, the first message can be received in response to a user engaging one or more data inputs at an earlier stage in a shipping process (e.g., on device 264 from FIG. 2B in prior to step 206 from FIG. 2A). In this regard, a shipper can demark a start time of a shipment through a graphical user interface (e.g., graphical user interface 900, 950 from FIG. 9A or 9B) on the device 264 from FIG. 2B after wirelessly connecting the device 264 to the environmental sensor device 100 (e.g., through the communications module 320 of FIG. 3). In various embodiments, the first message can contain a geographic location and a physical address information corresponding to the geographic location. In this regard, the computer-based system on the device 264 can determine the geographic location (e.g., via a geographical positioning system or the like) and transmit the geographic location and/or address information to the one or more servers 254 to be stored in the data record prior to the shipment, in accordance with various embodiments.

In various embodiments, after step 1010 of process 1000 from FIG. 10, the process 1000 can further comprise receiving, by the one or more servers 254, a second message indicating an end timestamp of the recording period, the second message containing the unique identifier of the environmental sensor device 100 and the end timestamp of the recording. The end timestamp can be demarked by a user (e.g., through the graphical user interface 900, 950 as shown in FIGS. 9A and 9B), automatically in response to updating the data record in step 1006 (e.g., if the environmental sensor device 100 is configured to not anticipate any intermediate data uploads to the one or more servers 254), or the like. The present disclosure is not limited in this regard.

In various embodiments, the first message (e.g., received by the one or more servers prior to step 1002 at a beginning of a shipment method 200 from FIG. 2A) and the second message (e.g., received by the one or more servers 254 after step 1010 of process 1000 from FIG. 10) each contain a geographic location and a physical address information corresponding to the geographic location. In this regard, a starting location and an ending location of the shipment can be included in the data record, in accordance with various embodiments.

In various embodiments, a snapshot of a shipment can be determined after completion of a respective shipment in accordance with the method 200 from FIG. 2A. For example, after step 1010 of process 1000, the one or more servers 254 may receive a message indicating a start timestamp and an end timestamp of a recording period associated with the environmental sensor device. In this regard, in response to a user engaging one or more data inputs in a graphical user interface, a user can input an estimated start time of the shipment and an estimated end time of the shipment. The estimated start time and the estimated end time can be transmitted by the computer-based system of the device 268 from FIG. 2B to the one or more servers 254 with the unique identifier for the environmental sensor device 100. Accordingly, the data record for the environmental sensor device 100 can be updated to include the start timestamp and the end timestamp provided by the user, in accordance with various embodiments.

Disclosed herein is a method for processing temperature data of an environmental sensor device. In various embodiments, the method comprises: receiving, by one or more servers, encoded data from a computer-based system that transmits the encoded data in response to receiving an information block with a Uniform Resource Identifier and the encoded data, the encoded data including environmental data; decoding, by the one or more servers, the encoded data to form a decoded data block; updating a data record with the environmental data from the decoded data block, the data record associated with a unique identifier for the environmental sensor device; generating, by the one or more servers, a formatted document including the environmental data; and transmitting, by the one or more servers, the formatted document to the computer-based system, wherein in response to receiving the formatted document, the computer-based system generates a graphical user interface based on the formatted document.

In various embodiments, the method can further comprise receiving, by the computer-based system, the Uniform Resource Identifier; and subsequently transmitting, by the computer-based system, the information block to the one or more servers. In various embodiments, in response to the computer-based system receiving the Uniform Resource Identifier, a data query parameter including the information block is extracted from the Uniform Resource Identifier. In various embodiments, the method can further comprise generating, by the computer-based system and based on permissions associated with a user of the computer-based system, data input actions through the graphical user interface.

In various embodiments, the graphical user interface comprises a data input, and in response to selecting the data input, an end timestamp for data collection associated with the environmental data is generated.

In various embodiments, the method can further comprise verifying, by the one or more servers, a public key of the environmental sensor device from the information block and a stored public key on the one or more servers are matching, wherein the stored public key is stored during commissioning of the environmental sensor device.

In various embodiments, the method can further comprise receiving, by the one or more servers, an encoded tap data during a commissioning task; decoding, by the one or more servers, the encoded tap data to form a decoded tap data; generating, by the one or more servers, an initial data record for the environmental sensor device associated with the unique identifier in response to determining the unique identifier does not match a stored unique identifier; and transmitting, by the one or more servers, the decoded tap data to the computer-based system, wherein in response to the unique identifier not matching any of a plurality of stored unique identifiers, the transmitting further includes an indication that the environmental sensor device is a newly commissioned device.

In various embodiments, the method can further comprise receiving, by the one or more servers, a physical unique identifier from the computer-based system, wherein the receiving the physical unique identifier is responsive to the computer-based system receiving, via scanning the physical unique identifier with a camera from a user device, a serial number disposed on the environmental sensor device; determining, by the one or more servers, the physical unique identifier and a manufactured unique identifier associated with the environmental sensor device in a list of manufactured unique identifiers match; and storing, by the one or more servers, the serial number associated with the physical unique identifier in the data record.

In various embodiments, the method can further comprise receiving, by the one or more servers, a channel open request; and in response to receiving the channel open request, a channel is opened between the environmental sensor device and the one or more servers. In various embodiments, the method can further comprise receiving, by the one or more servers and through the channel, a device public key and a device random number associated with the environmental sensor device; generating, by the one or more servers, a server random number, one of retrieving or generating a server private key and a server public key; generating a shared secret based on the device public key, the device random number, the server random number, and the server private key to form a cryptographic signature; generating, by the one or more servers, a signature of the server public key by signing the server public key with a server root private key; and transmitting, by the one or more servers and through the channel, the server public key, the server random number, and the signature of the server public key to the environmental sensor device; and receiving, by the one or more servers and through the channel, one of a confirmation of encryption for the environmental sensor device or an error message. In various embodiments, in response to receiving the confirmation of encryption, communication subsequently transmitted through the channel is encrypted. In various embodiments, in response to receiving the confirmation of encryption, the method further comprises decrypting the confirmation of encryption to form a decrypted message, verifying contents of the decrypted message, and completing a marking, by the one or more servers, a key exchange process between the environmental sensor device and the one or more servers as complete.

In various embodiments, the method can further comprise receiving, by the one or more servers, an update configuration request; retrieving, by the one or more servers, configuration settings from a database; and transmitting, by the one or more servers and through the channel, the configuration settings to the environmental sensor device. In various embodiments, the configuration settings can include a sampling rate and a number of samples per temperature sensor reading.

In various embodiments, the method can further comprise receiving, by the one or more servers, an initial tap data including an initial information block; and commissioning, by the one or more servers and through a channel opened by the one or more servers, the environmental sensor device, wherein in response to the commissioning the environmental sensor device, operational settings of the environmental sensor device is updated, a date and time of the environmental sensor device is updated, and future communications between the environmental sensor device and the one or more servers are encrypted.

In various embodiments, the method can further comprise receiving, by the one or more servers, a first message indicating a start timestamp of a recording period, the first message containing the unique identifier of the environmental sensor device and the start timestamp of the recording. In various embodiments, the first message can contain a geographic location and a physical address information corresponding to the geographic location. In various embodiments, the method can further comprise receiving, by the one or more servers, a second message indicating an end timestamp of the recording period, the second message containing the unique identifier of the environmental sensor device, and the end timestamp of the recording, wherein the first message and the second message each contain a geographic location and a physical address information corresponding to the geographic location.

In various embodiments, the method can further comprise receiving, by the one or more servers, a message indicating a start timestamp and an end timestamp of a recording period and the unique identifier for the environmental sensor device, wherein the message contains a geographic location and a physical address information corresponding to the geographic location.

In various embodiments, the method can further comprise receiving, by the one or more servers, a waypoint message, the waypoint message including the unique identifier of the environmental sensor device, and a geographic location. In various embodiments, the waypoint message can contain a physical address information corresponding to the geographic location. In various embodiments, the waypoint message can contain type information indicating a type of waypoint being recorded, and the type information is selected from a group consisting of "arrival", "transit", or "departure."

A system for processing environmental data received from an environmental sensor device is disclosed herein. In various embodiments, the system comprises one or more databases; one or more servers in electronic communication with the one or more databases, the one or more servers configured to: receive encoded data from a computer-based system that transmits the encoded data in response to receiving an information block with a Uniform Resource Identifier and the encoded data, the encoded data including the environmental data; decode the encoded data to form a decoded data block; update a data record in the one or more databases with the environmental data from the decoded data block, the data record associated with a unique identifier for the environmental sensor device; generate a formatted document including the environmental data; and transmit the formatted document to the computer-based system, wherein in response to receiving the formatted document, the computer-based system generates a graphical user interface based on the formatted document.

A method is disclosed herein. In various embodiments, the method comprises detecting, via an environmental sensor device and through a communications module, a user device having a computer-based system; responsive to detecting the user device, transmitting an information block through the communications module to the user device, the information block including a temperature sample data set, wherein in response to receiving the information block, the computer-based system of the user device automatically performs the following steps: transmitting, via the computer-based system, the information block to one or more servers for decoding; decoding, via the computer-based system and through the one or more servers, the information block to form a decoded information block; receiving, via the computer-based system, the decoded information block from the one or more servers, the decoded information block including the temperature sample data set; and displaying, via the computer-based system through a graphical user interface, the temperature sample data set in a standard format.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. An electronic system, the electronic system comprising:
a communication module;
a temperature sensor; and
one or more controllers in electronic communication with each of the communication module and the temperature sensor, the one or more controllers configured to:
 continually collect temperature samples, based on temperature readings from the temperature sensor, in a circular buffer;
 responsive to a new temperature sample being stored in the circular buffer to form a circular buffer data set, reformat and update an information block with the circular buffer data set, wherein continually collecting the temperature samples from the temperature sensor further comprises:
 receiving the temperature readings from the temperature sensor;
 aggregating the temperature readings to form a temperature sample; and
 storing the temperature sample in the circular buffer data set;
 temporarily store the temperature readings in a memory buffer to form a buffered data set, the temperature sample calculated from the buffered data set, and
 store the temperature sample calculated from the buffered data set in the circular buffer after the temperature sample is calculated, wherein:
 the memory buffer includes a number of the temperature readings prior to calculating the temperature sample, the number of the temperature readings corresponding to a readings data size;
 the memory buffer includes a first maximum data size;
 the circular buffer includes a second maximum data size;
 the readings data size is less than or equal to the first maximum data size; and
 the first maximum data size is less than the second maximum data size.

2. An environmental sensor device, comprising:
a housing; and
the electronic system of claim 1 disposed within the housing, wherein the one or more controllers is further configured to:
connect to a user device through the communication module; and
in response to connecting to the user device, automatically transmit the information block including the circular buffer data set to the user device through the communication module.

3. An environmental sensor device, comprising:
a housing; and
the electronic system of claim 1 disposed within the housing, wherein aggregating the temperature readings further comprises periodically calculating the temperature sample based on the temperature readings.

4. An environmental sensor device, comprising:
a housing; and
the electronic system of claim 1 disposed within the housing, wherein in response to the circular buffer receiving the temperature sample, the one or more controllers is further configured to reformat and update the information block to updated circular buffer values, the updated circular buffer values including the temperature sample.

5. The environmental sensor device of claim 4, wherein the one or more controllers is further configured to compress the information block prior to transmitting the information block to a user device.

6. An environmental sensor device, comprising:
a housing; and
the electronic system of claim 1 disposed within the housing, wherein:
the memory buffer includes the number of the temperature readings prior to calculating the temperature sample, the number of the temperature readings corresponding to the readings data size;
the memory buffer includes the first maximum data size;
the circular buffer includes the second maximum data size;
the readings data size is less than or equal to the first maximum data size; and
the first maximum data size is less than the second maximum data size.

7. An environmental sensor device, comprising:
a housing;
the electronic system of claim 1 disposed within the housing; and
a push button input coupled to the housing and in electronic communication with the one or more controllers, wherein the one or more controllers is further configured to:
receive an indication that a control input has been engaged; and
in response to receiving the indication, record a timestamp associated with the indication.

8. The environmental sensor device of claim 7, wherein the timestamp and a data associated with the indication are configured to be transmitted with the information block.

9. The electronic system of claim 1, wherein aggregating the temperature readings further comprises periodically calculating the temperature sample based on the temperature readings.

10. An environmental sensor device comprising:
a housing; and
an electronic system disposed within the housing, the electronic system comprising:
a communication module;
a temperature sensor; and
one or more controllers in electronic communication with each of the communication module and the temperature sensor, the one or more controllers configured to:
continually collect temperature samples, based on temperature readings from the temperature sensor, in a circular buffer;
responsive to a new temperature sample being stored in the circular buffer to form a circular buffer data set, reformat and update an information block with the circular buffer data set;
receive power from a power supply; and
responsive to receiving the power from the power supply, and while the power is maintained, perform the step of continually collecting temperature samples from the temperature sensor in the circular buffer to form the circular buffer data set, wherein:
in response to commissioning the electronic system, the one or more controllers is further configured to receive, via the communication module, a current date and a current time, and update a first device date and a first device time to the current date and the current time,
the one or more controllers is further configured to transmit, periodically, the circular buffer data set to a communications buffer to form the information block, the information block further including a second device date and a second device time based on an elapsed period of time from the first device date and the first device time, the second device date and the second device time forming a timestamp for transmitting the circular buffer data set to the communications buffer, and
in response to the connecting, via communication module, to a user device at any time after the transmitting the circular buffer data set to the communications buffer and prior to transmitting an updated circular buffer data set, the timestamp is automatically transmitted in the information block to the user device.

11. The environmental sensor device of claim 10, wherein the communication module includes a near field communication (NFC) subsystem and a Bluetooth® communication subsystem.

12. The environmental sensor device of claim 10, wherein:
in response to the user device receiving the information block through the communication module, the information block causes the user device to display data associated with the information block through one of a web page or a graphical user interface, and
the information block causes the data to be decoded on one or more servers.

13. The environmental sensor device of claim 10, further comprising a light sensor, wherein the one or more controllers is further configured to:
receive light readings from the light sensor;
determine, based on the light readings, a transition from a first light range to a second light range; and
record a second timestamp for the transition from the first light range to the second light range, wherein the second timestamp and a transition data associated with the transition from the first light range to the second light range are configured to be transmitted with the information block.

14. The environmental sensor device of claim 13, wherein the second timestamp is configured to be transmitted with the information block.

15. The environmental sensor device of claim 10, wherein the one or more controllers is further configured to:
receive, through the communication module, a configuration update request; and
responsive to the configuration update request, adjust at least one of:
a sampling rate of the circular buffer from a first sampling rate to a second sampling rate, and a maximum data size of the circular buffer from a first data size to a second data size.

16. The environmental sensor device of claim 10, further comprising a humidity sensor in electronic communication with the one or more controllers, the one or more controllers further configured to continually collect humidity samples from the humidity sensor, wherein the information block further comprises a humidity sample data set.

17. The environmental sensor device of claim 10, further comprising the power supply electrically coupled to the one or more controllers.

18. The environmental sensor device of claim 17, wherein in response to the power supply being configured to supply the power to the one or more controllers, the one or more controllers is configured to execute a commissioning task.

19. A shipping container, comprising a plurality of side panels at least partially defining a cavity, wherein the environmental sensor device of claim 17 is mounted to one of the plurality of side panels.

20. The environmental sensor device of claim 10, further comprising one or more status indicators disposed on the housing, each of the one or more status indicators including a light emitting diode.

21. The environmental sensor device of claim 10, wherein the one or more controllers is further configured to:
    temporarily store the temperature readings in a memory buffer to form a buffered data set, a temperature sample calculated from the buffered data set, and
    store the temperature sample calculated from the buffered data set in the circular buffer after the temperature sample is calculated.

22. The environmental sensor device of claim 21, wherein in response to the circular buffer receiving the temperature sample, the one or more controllers is further configured to reformat and update the information block to updated circular buffer values, the updated circular buffer values including the temperature sample.

23. The environmental sensor device of claim 22, wherein the one or more controllers is further configured to compress the information block prior to transmitting the information block to the user device.

24. The environmental sensor device of claim 21, wherein:
    the memory buffer includes a number of the temperature readings prior to calculating the temperature sample, the number of the temperature readings corresponding to a readings data size;
    the memory buffer includes a first maximum data size;
    the circular buffer includes a second maximum data size;
    the readings data size is less than or equal to the first maximum data size; and
    the first maximum data size is less than the second maximum data size.

25. An environmental sensor device comprising:
    a housing; and
    an electronic system disposed within the housing, the electronic system comprising:
        a communication module;
        a temperature sensor; and
        one or more controllers in electronic communication with each of the communication module and the temperature sensor, the one or more controllers configured to:
            continually collect temperature samples, based on temperature readings from the temperature sensor, in a circular buffer; and
            responsive to a new temperature sample being stored in the circular buffer to form a circular buffer data set, reformat and update an information block with the circular buffer data set, wherein:
                in response to commissioning the electronic system, the one or more controllers is further configured to receive, via the communication module, a current date and a current time, and update a first device date and a first device time to the current date and the current time,
                the one or more controllers is further configured to transmit, periodically, the circular buffer data set to a communications buffer to form the information block, the information block further including a second device date and a second device time based on an elapsed period of time from the first device date and the first device time, the second device date and the second device time forming a timestamp for transmitting the circular buffer data set to the communications buffer, and
                in response to connecting, via the communication module, to a user device at any time after the transmitting the circular buffer data set to the communications buffer and prior to transmitting an updated circular buffer data set, the timestamp is automatically transmitted in the information block to the user device, wherein the information block further comprises at least one of a unique identifier and an authentication key.

26. The environmental sensor device of claim 25, wherein:
    in response to the user device receiving the information block through the communication module, the information block causes the user device to display data associated with the information block through one of a web page or a graphical user interface, and
    the information block causes the data to be decoded on one or more servers.

27. The environmental sensor device of claim 25, further comprising a light sensor, wherein the one or more controllers is further configured to:
    receive light readings from the light sensor;
    determine, based on the light readings, a transition from a first light range to a second light range; and
    record a second timestamp for the transition from the first light range to the second light range, wherein the second timestamp and a transition data associated with the transition from the first light range to the second light range are configured to be transmitted with the information block.

28. The environmental sensor device of claim 25, wherein the one or more controllers is further configured to:
    receive, through the communication module, a configuration update request; and
    responsive to the configuration update request, adjust at least one of:
        a sampling rate of the circular buffer from a first sampling rate to a second sampling rate, and
        a maximum data size of the circular buffer from a first data size to a second data size.

29. The environmental sensor device of claim 25, further comprising a humidity sensor in electronic communication with the one or more controllers, the one or more controllers further configured to continually collect humidity samples from the humidity sensor, wherein the information block further comprises a humidity sample data set.

30. The environmental sensor device of claim 25, further comprising a power supply electrically coupled to the one or more controllers.

31. The environmental sensor device of claim 30, wherein in response to the power supply being configured to supply power to the one or more controllers, the one or more controllers is configured to execute a commissioning task.

32. The environmental sensor device of claim 25, further comprising one or more status indicators disposed on the housing, the each of the one or more status indicators including a light emitting diode.

33. The environmental sensor device of claim 25, wherein the communication module includes a near field communication (NFC) subsystem and a Bluetooth® communication subsystem.

\* \* \* \* \*